(12) United States Patent
Sowinski et al.

(10) Patent No.: US 7,218,776 B2
(45) Date of Patent: May 15, 2007

(54) PLURALITY OF PICTURE APPEARANCE CHOICES FROM A COLOR PHOTOGRAPHIC RECORDING MATERIAL INTENDED FOR SCANNING

(75) Inventors: Allan F. Sowinski, Rochester, NY (US); John D. Buhr, Fairport, NY (US); Geoffrey J. Woolfe, Penfield, NY (US); Karin Topfer, Rochester, NY (US); Lois A. Buitano, Potomac, MD (US); Richard P. Szajewski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 161 days.

(21) Appl. No.: 11/102,900

(22) Filed: Apr. 8, 2005

(65) Prior Publication Data

US 2005/0174591 A1 Aug. 11, 2005

Related U.S. Application Data

(63) Continuation of application No. 09/742,553, filed on Dec. 20, 2000, now abandoned, which is a continuation-in-part of application No. 09/592,816, filed on Jun. 13, 2000, now Pat. No. 6,781,724.

(51) Int. Cl.
*G06K 9/00* (2006.01)
(52) U.S. Cl. .................... 382/162; 382/167; 382/305; 382/2; 358/302

(58) Field of Classification Search ............... 382/162, 382/167, 305, 267, 276; 358/1.1, 487, 302, 358/1.15, 403; 705/16; 707/1; 700/95, 700/233
See application file for complete search history.

(56) References Cited

U.S. PATENT DOCUMENTS

| 4,553,156 A | 11/1985 | Douziech et al. |
|---|---|---|
| 4,591,923 A | 5/1986 | Urabe et al. |

(Continued)

FOREIGN PATENT DOCUMENTS

CN 1178953 A 4/1998

(Continued)

OTHER PUBLICATIONS

Research Disclosure #38957, Sep. 1996, pp. 591-639.

(Continued)

*Primary Examiner*—Jingge Wu
*Assistant Examiner*—Ali Bayat
(74) *Attorney, Agent, or Firm*—David A. Novais; Kathleen Neuner Mann

(57) ABSTRACT

A system and method of offering photofinishing services involves receiving an exposed photographic film from a customer; developing and scanning the film to produce a digital image; displaying examples of a plurality of looks on a color display medium to a customer; receiving a selection of a preferred look from the customer; and applying the selected look to the digital image to produce a processed digital image having the preferred look.

20 Claims, 13 Drawing Sheets

U.S. PATENT DOCUMENTS

| | | |
|---|---|---|
| 4,631,578 A | 12/1986 | Sasaki et al. |
| 4,654,722 A | 3/1987 | Alkofer |
| 4,670,793 A | 6/1987 | Yamada et al. |
| 4,694,342 A | 9/1987 | Klees |
| 4,805,031 A | 2/1989 | Powell |
| 4,829,370 A | 5/1989 | Mayne et al. |
| 4,839,721 A | 6/1989 | Abdulwahab et al. |
| 4,841,361 A | 6/1989 | Matsunawa et al. |
| 4,891,713 A | 1/1990 | Mizukoshi et al. |
| 4,912,569 A | 3/1990 | Petilli |
| 4,920,501 A | 4/1990 | Sullivan et al. |
| 4,929,979 A | 5/1990 | Kimoto et al. |
| 4,937,662 A | 6/1990 | Matsunawa et al. |
| 4,941,039 A | 7/1990 | D'Errico |
| 4,962,542 A | 10/1990 | Klees |
| 4,965,626 A | 10/1990 | Robison et al. |
| 4,972,256 A | 11/1990 | Hirosawa et al. |
| 4,974,096 A | 11/1990 | Wash |
| 4,977,521 A | 12/1990 | Kaplan |
| 4,979,027 A | 12/1990 | Sakai |
| 4,987,439 A | 1/1991 | Cloutier |
| 5,003,494 A | 3/1991 | Ng |
| 5,006,873 A | 4/1991 | Wash |
| 5,008,950 A | 4/1991 | Katayama et al. |
| 5,012,333 A | 4/1991 | Lee et al. |
| 5,021,820 A | 6/1991 | Robison et al. |
| 5,025,283 A | 6/1991 | Robison |
| 5,027,140 A | 6/1991 | Cloutier |
| 5,029,313 A | 7/1991 | Robison et al. |
| 5,031,852 A | 7/1991 | Dowling et al. |
| 5,049,984 A | 9/1991 | Moore, Jr. et al. |
| 5,051,842 A | 9/1991 | Shimazaki |
| 5,053,324 A | 10/1991 | Sasaki |
| 5,065,255 A | 11/1991 | Kimura et al. |
| 5,070,413 A | 12/1991 | Sullivan et al. |
| 5,081,529 A | 1/1992 | Collette |
| 5,081,692 A | 1/1992 | Kwon et al. |
| 5,105,266 A | 4/1992 | Telle |
| 5,105,469 A | 4/1992 | MacDonald et al. |
| 5,107,346 A | 4/1992 | Bowers et al. |
| 5,118,591 A | 6/1992 | Koboshi et al. |
| 5,130,745 A | 7/1992 | Cloutier et al. |
| 5,194,892 A | 3/1993 | Robison |
| 5,204,708 A | 4/1993 | Whitfield et al. |
| 5,229,810 A | 7/1993 | Cloutier et al. |
| 5,267,030 A | 11/1993 | Giorgianni et al. |
| 5,276,472 A | 1/1994 | Bell et al. |
| 5,300,381 A | 4/1994 | Buhr et al. |
| 5,327,265 A * | 7/1994 | McDonald ............... 358/527 |
| 5,447,811 A | 9/1995 | Buhr et al. |
| 5,452,111 A | 9/1995 | Giorgianni et al. |
| 5,528,339 A | 6/1996 | Buhr et al. |
| 5,541,645 A | 7/1996 | Davis |
| 5,563,720 A | 10/1996 | Edgar et al. |
| 5,574,519 A | 11/1996 | Manico et al. |
| 5,579,132 A | 11/1996 | Takahashi et al. |
| 5,582,961 A | 12/1996 | Giorgianni et al. |
| 5,587,961 A | 12/1996 | Wright et al. |
| 5,609,403 A | 3/1997 | Bell et al. |
| 5,609,978 A | 3/1997 | Giorgianni et al. |
| 5,666,215 A * | 9/1997 | Fredlund et al. ............ 358/487 |
| 5,694,484 A | 12/1997 | Cottrell et al. |
| 5,698,379 A | 12/1997 | Bohan et al. |
| 5,726,737 A | 3/1998 | Fredlund et al. |
| 5,748,484 A * | 5/1998 | Cannon et al. ............. 700/233 |
| 5,753,424 A | 5/1998 | Ishikawa |
| 5,754,222 A | 5/1998 | Daly et al. |
| 5,774,752 A | 6/1998 | Patton et al. |
| 5,777,677 A | 7/1998 | Linzer et al. |
| 5,835,627 A | 11/1998 | Higgins et al. |
| 5,840,470 A | 11/1998 | Bohan et al. |
| 5,851,745 A | 12/1998 | Takeuchi |
| 5,851,749 A | 12/1998 | Okawa et al. |
| 5,858,629 A | 1/1999 | Ishikawa et al. |
| 5,871,800 A | 2/1999 | George et al. |
| 5,874,203 A | 2/1999 | Morita et al. |
| 5,874,988 A | 2/1999 | Gu |
| 5,878,292 A | 3/1999 | Bell et al. |
| 5,888,704 A | 3/1999 | Kikuchi |
| 5,893,101 A | 4/1999 | Balogh et al. |
| 5,922,519 A | 7/1999 | Ishikawa et al. |
| 5,945,264 A | 8/1999 | Asami et al. |
| 5,956,044 A | 9/1999 | Giorgianni et al. |
| 5,962,205 A | 10/1999 | Arakawa et al. |
| 5,972,585 A | 10/1999 | Sowinski et al. |
| 5,974,401 A | 10/1999 | Enomoto et al. |
| 5,976,771 A | 11/1999 | Kosugi et al. |
| 5,986,671 A | 11/1999 | Fredlund et al. |
| 5,995,654 A | 11/1999 | Buhr et al. |
| 6,005,972 A | 12/1999 | Fredlund et al. |
| 6,017,157 A | 1/2000 | Garfinkle et al. |
| 6,017,688 A | 1/2000 | Edgar |
| 6,030,755 A | 2/2000 | Matsumoto et al. |
| 6,045,983 A | 4/2000 | Buitano et al. |
| 6,046,723 A | 4/2000 | Daniels et al. |
| 6,051,359 A | 4/2000 | Ohkawa et al. |
| 6,069,714 A | 5/2000 | Edgar |
| 6,093,526 A | 7/2000 | Buitano et al. |
| 6,115,717 A | 9/2000 | Mehrotra et al. |
| 6,133,985 A | 10/2000 | Garfinkle et al. |
| 6,134,315 A | 10/2000 | Galvin |
| 6,143,482 A | 11/2000 | Buitano et al. |
| 6,146,818 A | 11/2000 | Gonzalez et al. |
| 6,781,724 B1 * | 8/2004 | Szajewski et al. ............ 358/487 |
| 2002/0161835 A1 * | 10/2002 | Ball et al. .................. 709/203 |

FOREIGN PATENT DOCUMENTS

| | | |
|---|---|---|
| EP | 0 234 833 A2 | 9/1987 |
| EP | 0 845 897 A | 6/1998 |
| EP | 0 851 661 A2 | 7/1998 |
| EP | 0 860 980 A | 8/1998 |
| EP | 0 905 561 A1 | 3/1999 |
| EP | 0 971 314 A2 | 1/2000 |
| EP | 0 978 762 A1 | 2/2000 |
| EP | 0 991 019 A2 | 4/2000 |
| EP | 0 991 020 A2 | 4/2000 |
| EP | 1 004 967 A1 | 5/2000 |
| GB | 2286944 A | 8/1995 |
| WO | WO 98/25399 | 12/1997 |
| WO | WO 00/29935 | 5/2000 |

OTHER PUBLICATIONS

Research Disclosure #308119, Dec. 1989, pp. 993-1015.
Research Disclosure #17643, Dec. 1978, pp. 22-31.
"The British Journal of Photography Annual", 1988, pp. 196-198.
Eastman Kodak Company,"Using Kodak Flexicolor Chemicals", Kodak Publication No. Z-131.
E. Goll et al, "Modern Exposure Determination for Customizing Photofinishing Printer Response", Journal of Applied Photographic Engineering, 2, 93, 1979.
Giorgianni and Madden, "Digital Color Management: Encoding Solutions", 1998.
R.W.G. Hunt, "The Reproduction of Color in Photography, Printing and Television", Fifth Edition, 1995, Chapter 9, pp. 136-150.
"Colorimetry", Second Edition, CIE Publication 15.2-1986.
International Color Consortium, "File Format for Color Profiles", specification ICC.1:1998-09.
International Color Consortium, Addendum 2 to Spec. ICC.1:1998-09.
International Color Consortium, Document ICC.1A:1999-04.
K. Spaulding et al, IS&T PICS Conference Proceedings, (2000), pp. 155-163.
W. Benedetti, "Photoelectronic Imaging", Mar. 2000, pp. 28-31.

* cited by examiner

| | |
|---|---|
| LAST NAME: | ☐ |
| FIRST NAME: | ☐  MI: ☐ |

BILLING ADDRESS:

| | |
|---|---|
| STREET: | ☐  APT: ☐ |
| CITY: | ☐ |
| STATE: | ☐▼  ZIP CODE: ☐ |

SHIPPING ADDRESS:

| | |
|---|---|
| STREET: | ☐  APT: ☐ |
| CITY: | ☐ |
| STATE: | ☐▼  ZIP CODE: ☐ |
| TELEPHONE NO.: | ☐ |
| E-MAIL ADDRESS: | ☐ |
| CREDIT CARD: | ☐▼ |
| CARD NO.: | ☐ |
| EXPIRATION DATE: | ☐ |
| NETWORK USER ID: | ☐ |
| NETWORK PASSWORD: | ☐ |
| REPEAT PASSWORD: | ☐ |
| REMEMBER PASSWORD: | ◉ YES  ◉ NO |
| NOTIFY ME BY E-MAIL WHEN I HAVE PICTURES: | ◉ YES  ◉ NO |
| E-MAIL IMAGETTES FOR HOME APPROVAL: | ◉ YES  ◉ NO |
| REMEMBER MY PICTURE PREFERENCES: | ◉ YES  ◉ NO |

PLURALITY OF PICTURE APPEARANCE CHOICES FROM A COLOR PHOTOGRAPHIC RECORDING MATERIAL INTENDED FOR SCANNING

CROSS REFERENCE TO RELATED APPLICATIONS

This is a continuation of U.S. Ser. No. 09/742,553 filed Dec. 20, 2000, now abandoned which is a continuation-in-part of U.S. Ser. No. 09/592,816, filed Jun. 13, 2000. now U.S. Pat. No. 6,781,724

FIELD OF THE INVENTION

The present invention relates to the field of photography; more particularly, it relates to a photofinishing system as well as to an electronic image processing and manipulation arrangement, which includes digital image processing. The method is especially suitable for providing a selection of scene reproductions with more than one particular characteristic appearance or "look", where the image reproduction selection is achieved by the exposure, development, and scanning and image processing of a color photographic recording material intended for scanning.

BACKGROUND OF THE INVENTION

Color photographic systems known in the art capture images of scenes on light-sensitive silver halide media or electronic devices, recording the exposing light in analog or digital form, respectively. Following processing, they provide printed hard copy or soft copy output as a visual reproduction of the recorded scene. For example, scene images can be captured on color negative film and then reproduced after chemical development by optical printing, or scanning and electronic writing on photographic paper. Scene images can also be captured on reversal photographic materials, such as slide transparencies, and then be viewed directly by projection or back-illumination, or even be printed onto silver halide photographic paper. In other cases, color images can be captured by electronic devices, such as video cameras or digital still cameras, and viewed on monitors or printed using dye sublimation thermal printers. The systems mentioned above are just some examples of color image recording systems. In each case, these systems produce different appearance characteristics in the color reproduction.

These differing reproduction appearance characteristics are a result of a number of different factors. The final appearance relates to the properties of the scene-recording element (color recording accuracy and signal-to-noise), the system image processing (rendering of hue, colorfulness, lightness, noise, sharpness, and tone scale), and the display form (print, slide or soft copy) with its individual color reproduction gamut, as well as the viewing conditions and the state of adaptation of the viewer. In a traditional photographic system which includes a color negative film and photofinishing involving film development and tail-end processing—and optical printing onto color paper with its subsequent development and tail-end processing—the film tends to dominate the imaging chain properties. Its color recording accuracy, graininess, sharpness enhancement, contrast or gamma, and particularly its chemical interlayer interimage effects, which provide full system color correction and sharpness enhancement, tend to produce a recognizable, characteristic appearance of the final reflection print across all subject matter. The sustained improvement of these individual properties and their aggregate performance has been the basis for marketplace competition in film for decades. Furthermore, the overall limitations of a pure chemical imaging system, particularly around color and tone reproduction, have forced the specialization of films for different applications and induced the marketplace to segment the product category into different lines. Consumers typically select film giving higher print contrast and colorfulness for general-purpose photography, whereas advanced amateurs often prefer films producing more accurate color reproduction with lower contrast. Professional photographers select films for portraiture producing low print contrast and excellent flesh hues, with lower sharpness for a softer, more pleasing look. Should a photographer have mixed subject matter (e.g., portraits, scenic landscapes, and "candid or grab-shots" of people), the film properties will compromise the print reproduction of at least some of the images relative to the selection of a specialized film. This compromise is so significant that Advanced Photo System™ camera designers have made film mid-roll interrupt a premium camera feature so the photographers can remove a partially used film roll and replace it with another better suited to the photographer's changing artistic preference or scene content requirements. The astute photographer knows to select a particular film to achieve a desired characteristic print appearance, or "look".

Electronic image processing following film scanning or digital still camera capture, new silver halide paper writing devices (e.g., laser writers), and new print methods and media (e.g., inkjet printers and inks) are revolutionizing color reproduction by re-defining print color and tone rendering. The rigid limitations imposed by a pure chemical system of color correction and image structure management with a silver halide print of the prior art have been removed, and many system tone scales, colorfulness levels, hue and lightness renditions, and sharpness levels can be provided using an electronic signal processing chain. Thus it is possible to manipulate the appearance characteristics in an automated photofinishing process by applying mathematical algorithms to the individual image pixel data to provide a scene reproduction having a desired balance of contrast, color saturation and pleasing skin tones as determined by a manufacturer or photofinisher. See for example U.S. Pat. No. 5,528,339 to Buhr et al.

Digital minilab photofinishing systems are beginning to supplement optical printing minilabs in the commercial trade, in part to provide printing services to digital still camera photographers as well as network services to current camera films designed for optical printing. The NORITSU QSS-2711 DLS System uses KODAK DLS Software in order to provide silver halide prints enhanced by electronic image processing that have adjusted contrast, color balance corrected for indoor lighting, and increased print sharpness. It also provides special effects printing, including black-&-white or sepia-toned renditions of color input (e.g., from color recording films or digital cameras) and exaggerated, high-color printing.

The success of such digital image processing to provide one or more pleasing print appearances still depends heavily on the quality of the image capture medium or device. Current photographic image capture films were designed for direct viewing (color reversal) or optical printing (color negative) and are sub-optimal for digitization compared with films designed for scanning and electronic signal processing. U.S. Pat. No. 5,582,961 to Giorgianni et al. describes a color reversal photographic recording material providing colorimetrically accurate scene capture that is intended for scanning and not for direct viewing or optical printing onto silver halide color paper (i.e., a scan film or scan-only film). A viewable image can be obtained by scanning a color negative film that lacks colored masking couplers, as in U.S. Pat. No. 5,698,379 to Bohan et al. or in U.S. Pat. No. 6,021,277 to Sowinski et al., for example. Having been so designed without inherent system color correction properties like optical print films or slide films, a scan film has no acceptable characteristic image reproduction appearance associated with it, and one must be provided by the selection of digital image processing parameters. Providing more than one desirable print appearance from the image data produced from the scan film is not mentioned in U.S. Pat. Nos. 5,587,961, 5,698,379 and 6,021,277.

It would be highly desirable to provide photographers with greater control and selection over the look of their pictures derived from a single taking medium, and to enable the convenience of exercising this control after the exposure stage of photography, contrary to the present situation involving silver halide color films intended for optical printing or direct viewing.

SUMMARY OF THE INVENTION

The above need is met by a first aspect of the present invention, by providing a method of photofinishing including the steps of offering a plurality of possible image looks and representing the selections on a display medium; receiving image-bearing electronic signals derived from a color photographic recording material intended for scanning from a sender; selecting one or more of the possible looks to apply to image-bearing electronic signals derived from a color photographic recording material intended for scanning; processing said image-bearing electronic signals to provide a processed image having the properties of the selected look; and transferring the processed image to an intended recipient.

A second aspect of the present invention is to provide a method of photofinishing including the steps of offering a plurality of possible image looks and representing the selections on a display medium; receiving an exposed color photographic recording material intended for scanning; processing the exposed color photographic recording material to produce an image suitable for scanning; scanning the image to produce image-bearing electronic signals; processing the image-bearing electronic signals to apply a selected look and; providing a processed image with the appearance characteristics of the selected look to an intended recipient.

The present invention has an advantage of providing a photographer with the choice of differing image looks or appearance characteristics that can be selected at any point in the photographic scene capture and image reproduction process, and which can be applied to the image at the time of photofinishing. The method allows for the use of a single photographic recording material intended for scanning to produce a selection of different image appearances, which provides convenience and simplicity over selecting from a plurality of films intended for optical printing or direct viewing at the time of photographic capture. These differing looks are produced from an origination image file resulting from scanning a photographic recording material that is intended for scanning, providing enormous flexibility in the processes of image look selection and photofinishing. According to a preferred embodiment, the photofinishing method can be offered as an interactive service with an Internet World Wide Web site. The photofinisher supplies the customer with a scan film and a processing mailer. The examples of looks are displayed on the Web site and the customer selects one or more of the looks to be applied to his images.

The present invention therefore relates to a photofinishing method which comprises offering a plurality of available image looks to a customer in a manner which permits the customer to select at least one image look for association with at least one image captured by the customer on scan-only photographic material; converting the at least one image to an image-bearing electronic signal representative of the at least one image; applying the selected look to the image-bearing electronic signal; processing the image-bearing electronic signal to provide a processed image having properties of the selected image look; and transferring the processed image to at least one of a customer or an intended recipient.

The present invention further relates to a photofinishing method which comprises offering a plurality of possible image looks and representing the image looks on a display medium for viewing and selection by a customer; receiving an exposed color photographic recording material intended for scanning from the customer; processing the exposed color photographic recording material to produce an image suitable for scanning; scanning the image to produce image-bearing electronic signals; processing the image-bearing electronic signals to apply a selected look from the plurality of possible image looks; and providing a processed image with an appearance characteristic of the selected image look to at least one of the customer or an intended recipient.

The present invention further relates to a photofinishing method which comprises offering a plurality of available image looks to a customer in a manner which permits the customer to select at least one image look which is to be applied to an image-bearing electronic signal representative of a captured image; receiving the image-bearing electronic signal and information representative of the selected image look; processing the image-bearing electronic signal to provide a processed image having properties of the selected image look; and transferring the processed image to at least one of the customer or an intended recipient.

The present invention further relates to an image processing arrangement which comprises an input section adapted to receive a digital image; and a processing section including a display for displaying a plurality of available image looks. The processing section is adapted to permit a user to select at least one look from the available looks for association with the digital image, and to process the digital image to provide for a processed image having properties of the selected look.

The present invention further relates to a computer program product, comprising a computer readable storage medium having a computer program stored thereon, which when loaded into the computer, causes the computer to perform the steps of: offer a plurality of available image looks to a customer in a manner which permits the customer to select at least one image look which is to be applied to an image-bearing electronic signal representative of a captured image; transfer the image-bearing electronic signal and information representative of the selected image look to a photofinishing service provider; process the image-bearing electronic signal to provide a processed image having properties of the selected image look; and transfer the processed image to at least one of the customer or an intended recipient.

The present invention further relates to a photofinishing method based on an interactive photofinishing service ordering session between a photofinishing service provider and a customer. The method comprises checking for a stored customer profile for the customer based on at least a customer identification of the customer, with the customer profile including information representative of previously selected preferred image looks for the customer. If the customer has a stored customer profile, the method comprises offering a plurality of possible image looks to the customer in a manner which permits the customer to select a preferred image look which is to be applied to an image bearing electronic signal representative of a captured image, with at least one of the offered possible image looks being a previously selected preferred image look from the stored customer profile; and updating the stored customer profile based on the selected preferred image look. If the customer does not have a stored customer profile, the method comprises offering a plurality of possible image looks to the customer in a manner which permits the customer to select at least one image look which is to be applied to an image bearing electronic signal representative of a captured image; and creating a new customer profile based on the selected image look.

The present invention further relates to a computer program product which comprises a computer readable storage medium having a computer program stored thereon, which when loaded into the computer, causes the computer to perform the steps of offering photofinishing services based on an interactive photofinishing service ordering session between a photofinishing service provider and a customer which comprises checking a server for a stored customer profile for the customer based on at least a customer identification of the customer. The customer profile includes information representative of previously selected preferred image looks for the customer, wherein if the customer has a stored customer profile, the method comprises offering a plurality of possible image looks to the customer in a manner which permits the customer to select a preferred image look which is to be applied to an image-bearing electronic signal representative of a captured image, with at least one of the offered possible image looks being a previously selected preferred image look from the stored customer profile; and updating the stored customer profile based on the selected preferred image look. If the customer does not have a stored customer profile, the method comprises offering a plurality of possible image looks to the customer in a manner which permits the customer to select at least one image look which is to be applied to an image bearing electronic signal representative of a captured image; and creating a new customer profile based on the selected image look.

The present invention further relates to a photofinishing method based on an interactive photofinishing service ordering session between a photofinishing service provider and a customer, wherein the customer accesses a monitor during the ordering session. The method comprises determining monitor settings of the monitor accessed by the customer; comparing the determined monitor settings to optimum monitor settings that provide preferred calibration results; providing color calibration information to the customer based on the comparing step; and checking for a stored customer profile for the customer based on at least a customer identification of the customer. The customer profile includes information representative of preferred monitor settings for the customer.

The present invention further relates to a computer program product which comprises a computer readable storage medium having a computer program stored thereon, which when loaded into the computer, causes the computer to perform the steps of: offer photofinishing services based on an interactive photofinishing service ordering session between a photofinishing service provider and a customer, wherein the customer accesses a monitor during the interactive ordering session; determine monitor settings of the monitor accessed by the customer; compare the determined monitor settings to optimum monitor settings that provide preferred calibration results; provide color calibration information to the customer based on the comparing step; and check for a stored customer profile for the customer based on at least a customer identification of the customer. The customer profile includes information representative of preferred monitor settings for the customer.

BRIEF DESCRIPTION OF THE DRAWINGS

FIG. 3 is a computer monitor display of an Internet Web page relating to a method of interactive picture look selection;

FIG. 4A is a computer monitor display of an Internet Web page showing the examples of image looks provided according to the present invention;

FIG. 4B is a computer monitor display of an Internet Web page showing examples of additional information that can be associated with and accompany the image looks provided according to the present invention;

DETAILED DESCRIPTION OF THE INVENTION

Figure 1:
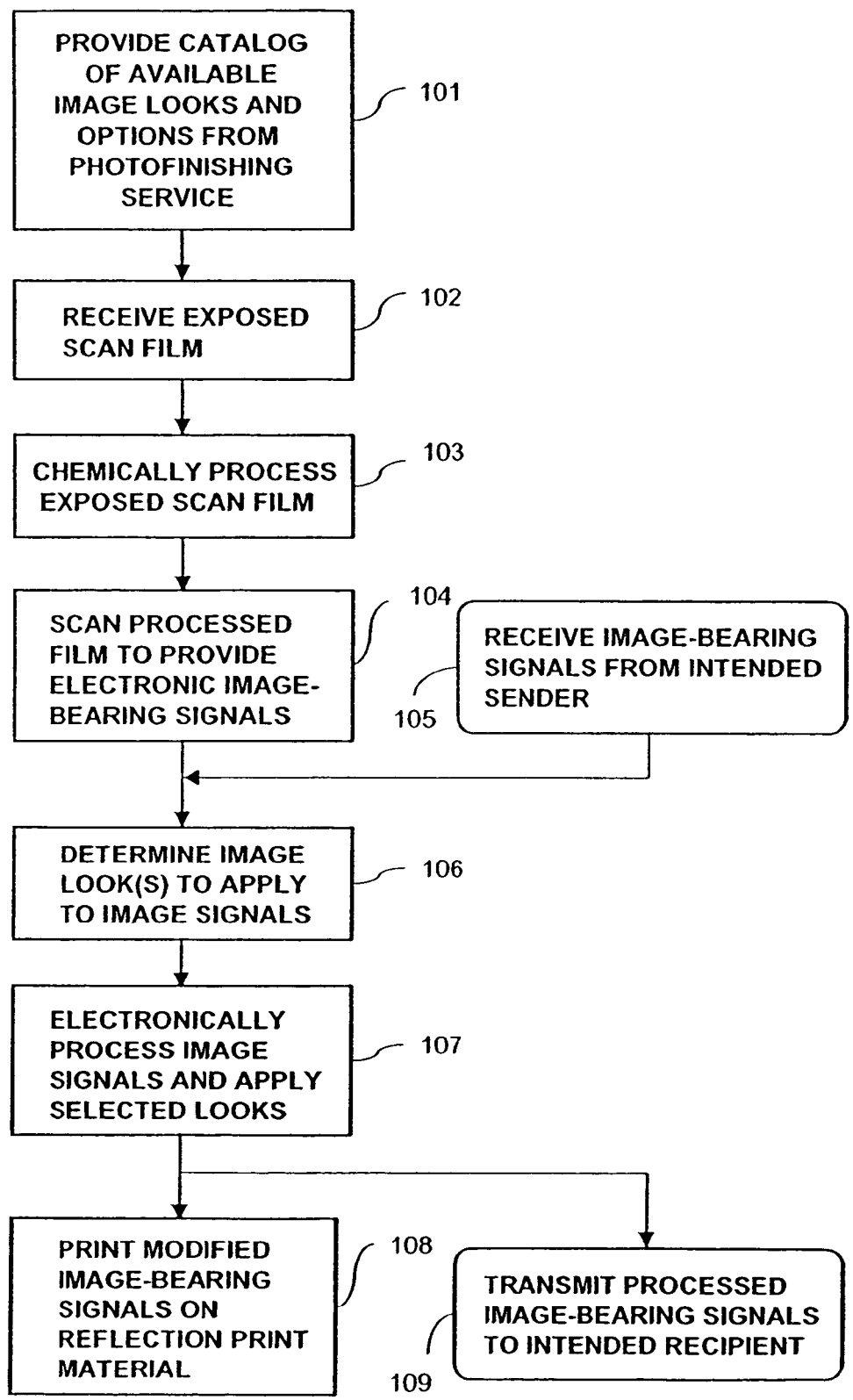
FIG. 1 is a block diagram showing a photofinishing system according to the present invention.

FIG. 1 is a block diagram illustrating an embodiment of the present invention. In step 101, a photofinisher provides a catalog of available image looks and options for the photofinishing service. An image "look" can be defined by characterizing the appearance of a reproduction relative to the appearance of the original scene. Individuals differ in their preference for appearance characteristics of image reproductions. An original scene can be reproduced with accurate hues, or with hues shifted in color space according to an individual or a general population preference. An original scene can be reproduced with varying levels of colorfulness, i.e., entirely without color as in black-and-white, with accurate colorfulness, or with increased colorfulness; in addition, the colorfulness of particular colors within the scene may desirably be manipulated relative to one another. An original scene can be reproduced with varying levels of lightness, e.g., contrast, and with rendering tone scales that vary with overall light levels; tone scale selection can be used to mitigate the visual effect of harsh scene lighting (e.g., lower contrast) or flat scene lighting (e.g., higher contrast). Furthermore, spatial image manipulations relating to image noise alteration (e.g., noise reduction or graininess smoothing) and detail or sharpness alteration (e.g., unsharp masking to increases low frequency information) can also affect the appearance of and desirability of a scene reproduction.

Within the context of the present invention, the term "looks" relates to specific combinations of color hue reproduction, colorfulness level and tonal rendering, and spatial manipulations, which provide pleasing scene reproductions to one or more individuals. It will be appreciated that a pleasing scene reproduction to a particular individual or group of individuals does not necessarily provide for superior scene reproduction from a technical basis. For example, a grotesque or dark, Gothic reproduction of a scene which may be pleasing to a particular individual, but not necessarily an accurate or broadly preferred rendering of the captured scene, falls within the scope of the present invention.

Figure 2A:
FIG. 2A is the front side of a film processing envelope for photofinishing services that provide selectable image looks.
Figure 2B:
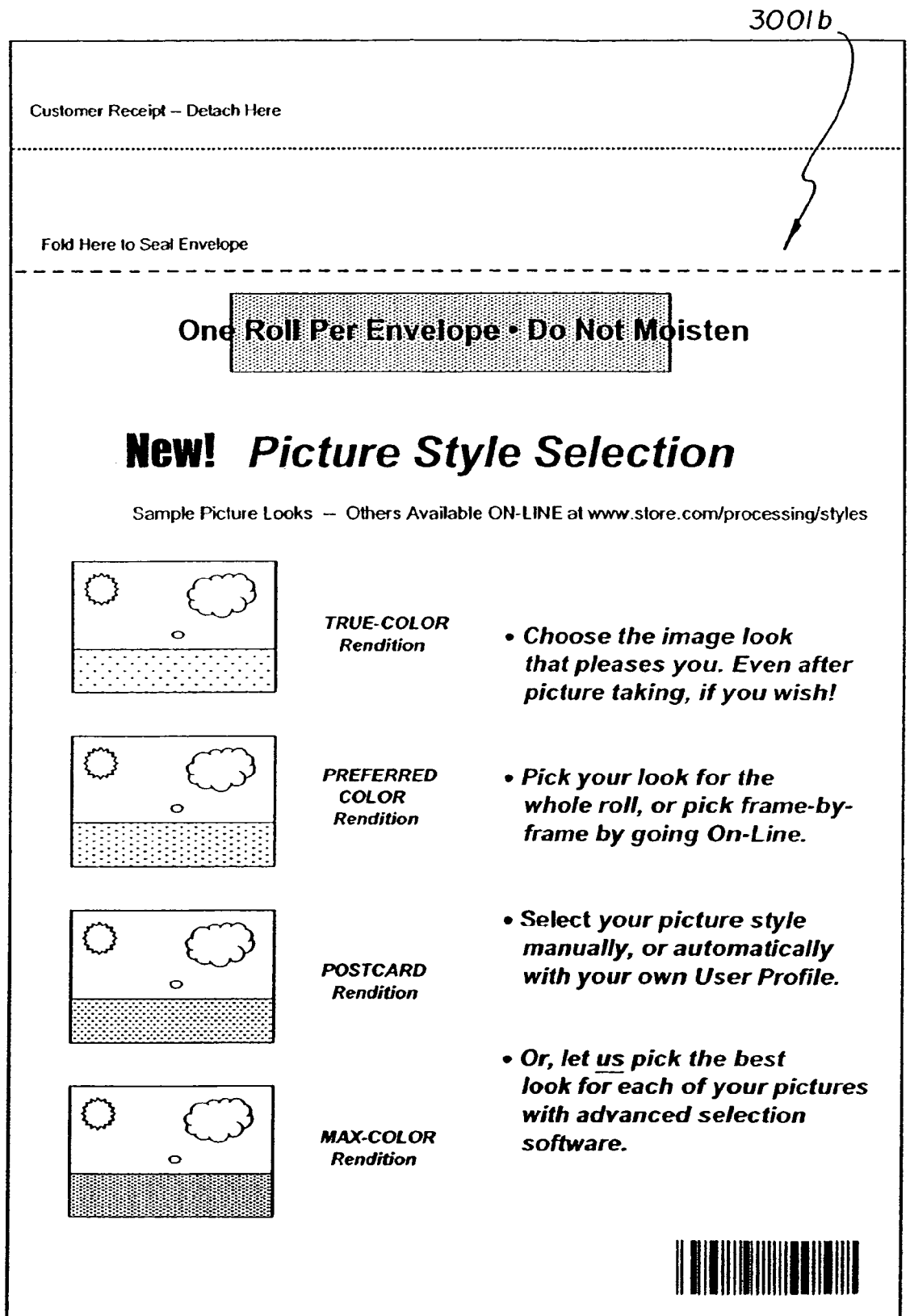
FIG. 2B is the backside of a film processing envelope for photofinishing services, which displays a catalog of the variable image reproductions.

The catalog described in FIG. 1 can be a brochure, a sign, an advertisement or a poster. The catalog can be a film processing envelope, an order form, a bill, or a receipt. The catalog can be represented in a printed form on a reflection material or by an electronic display technology, such as a computer monitor, a liquid crystal display (LCD), a television, or a personal digital assistant. It can be represented by a verbal description suitable for receipt by a voice technology, such as cellular telephone. It is a common practice for a photofinisher, when receiving film for processing, to supply the customer with a processing envelope; when the photofinisher is a wholesale, mail order institution, the processing envelope can be sent through the mail (i.e., a mailer). The customer's exposed film is placed in the processing envelope and sealed, with customer order information such as name, order options, billing method, and a means of contact such as a daytime telephone number commonly supplied. FIG. 2A shows the front side 3000*a* of a film-processing envelope for photofinishing services that offer the selection of different image looks (section 3001*a*) from a single film capture medium. The backside 3000*b* of a film-processing envelope is shown in FIG. 2B, which provides a catalog (section 3001*b*) of some available image looks.

On the processing envelope are commonly found check-off boxes, which provide a menu of options for the photofinishing order. For example, the processing envelope can offer various print sizes, single or duplicate prints, and enlargements; it is preferred for the envelope to disclose photofinishing options around variable image appearances. For the purposes of the invention, the catalog can constitute a description on the film container itself or any associated packaging that indicates the possible use of the film to provide multiple looks. It is common trade practice with consumer photographic films to describe the applications of the product on the container box both on the inside and on the outside. It is also contemplated that the camera used to expose the film can interrogate a microchip, a magnetic coating, or other information storage means associated with the film, or its cartridge or cassette, in order to determine the possible use of the film to provide a selection of image appearances. In an especially preferred form of the invention, the catalog is represented by a World Wide Web (WWW) page on the Internet. It is contemplated that the customer may purchase both unexposed film and its processing through the same channel at the same time, or through different channels at different times and, after taking pictures, return the exposed film to the photofinisher for development and image processing. There is no requirement that the film bear an indication of its suitability for photofinishing to provide multiple appearances (e.g., an advertised, conforming use). Only the photofinisher, his intermediaries, or his agents need to provide a description of the photofinishing service that provides a selection of image appearances according to the invention. For the purposes of the invention, the customer can be a single individual, such as the photographer who exposed the photographic recording material, or a retail client of the photofinishing service, or he may represent a group of individuals buying services as a consortium (e.g., a club, a cooperative, a business, a firm, an institution, a government organization). The photofinisher can be an actual operation that conducts all of the technical work of film scanning, image processing, image transmission, processed image printing, etc., or the photofinisher can be a service providing party that offers one of more services to customers and that in turn receives one or more of the needed technical steps or services from a different service provider. In one example of the invention, the photofinisher is a service provider, which only deals in reprinting previously developed film.

The characteristic appearance that is produced by the invention can be represented by a verbal description, a written description, by icons, by graphical means, or by pictorial description, or by a combination of the various means. It is preferred to represent the different image looks produced by the invention with a pictorial representation, in particular a sample image. It is recognized, however, that the limitations of the printing methodology may compromise the quality of the representation. It is also appreciated that the visual ability or acuity of the viewer or purchaser will vary among the population. The lighting under which the customer views the brochure, the viewer's state of adaptation, or even the production features of the catalog may affect his perception of the nature of the look. Therefore it is highly preferred to supplement pictorial representations of the image looks with text descriptions of the properties of the looks. It is preferred to describe the image looks in terms of the presence or absence of color (that is, a color image, a black-and-white image, or a sepia image, for example), image contrast, image colorfulness, image hue rendition, and image sharpness and graininess. It is also possible to compare the offered looks to existing film products known for characteristic or trademark looks. It is also possible to characterize the looks by a ranking system, such as: good, better, best. It is furthermore possible to characterize the image looks by customer segmentation; for example, color rendition preferred by teenagers, by artists, by professional photographers, or by geographical, regional or cultural preference. It is preferred to represent the image looks by application such as landscape, portraiture, baby picture, candid or grab shot, party scene, dreary day, snow or beach scene, and so forth. The image looks can also be characterized by their suitability for a particular viewing condition or lighting condition during exposure such as bright lighting levels, low lighting levels, tungsten lighting, natural daylight illumination, artificial fluorescent illumination, and so forth. The image looks can furthermore be characterized by their suitability for viewing by a particular segment of the population, such as young persons with excellent visual acuity, middle-aged people with farsightedness, and the elderly with declining visual abilities.

In a highly preferred embodiment, the photofinishing catalog or brochure is displayed on the Internet as a WWW page. The Internet comprises a large number of computers and computer networks that are interconnected through communication links. The interconnected computers exchange information using various services, such as electronic mail, Gopher, and the Web. The Web service allows a server computer system (a Web server or Web site) to send pages of graphical information to a remote client computer system. The remote client computer system can then display the Web pages. Each source of content that is a computer Web page of the WWW is uniquely identifiable by a Uniform Resource Locator (URL). In order to view a specific Web page, the client computer system specifies the URL for that Web page in a request. The request is forwarded to the Web server that supports that Web page. When the Web server receives the request, it sends that Web page to the client computer system. When the client computer system receives that Web page, it typically displays the Web page using a browser program. A browser is a special-purpose application program that conducts the requesting of Web pages and the displaying of Web pages.

The WWW of the Internet is a particularly suitable means to both display the image looks and to interact with the customer to accept an order and generate a billing transaction. An Internet-based catalog can have an introductory page identifying the service and provider, a tutorial page, a sample image page, an ordering page for the photographic recording material or the image processing services, and the address or location of available retail laboratories or sites offering the film, photofinishing service, or the bundled combination if available. Due to concerns about home monitor calibration, it would be preferred to represent the sample images in an exaggerated form that emphasizes the differences between the image the looks, and to supplement the images with text descriptions of the properties of the look. It is contemplated to make sample image looks available for downloading as image files (e.g., a tagged-image-file-format (TIFF) file) over the Internet for home printing so that a customer can see sample images prepared on his home printing equipment, such as an inkjet printer. An example of printing over a network is KODAK PHOTONET ONLINE service offered by Eastman Kodak Company, Rochester, N.Y.

In step 102 (FIG. 1), a photofinishing service receives the customer's exposed scan film. While any camera speed photographic recording material, or image file derived from a recording material (e.g., a film scan), a recorded image (e.g., a print scan image file) or an electronic recording device (e.g., a digital still camera), can be employed in the practice of this invention, the ability to provide superior image capture and storage properties and electronic image processing capability is greatly facilitated by employing a film designed for scanning. A film intended for scanning can be characterized by having low suitability for both direct viewing (e.g., projection) and optical printing. The film intended for scanning may be suitable for wet, aqueous processing including lamination and chemical transfer methods, or it may be suitable for dry, thermal processing by being comprised of incorporated development chemicals.

In one embodiment, a dry-process film intended for scanning can be characterized as a light sensitive silver halide photographic recording material having an incorporated developer in a binder on a support and capable of forming a differentiable machine-readable image which includes a non-diffusible dye by the application of heat.

In a second embodiment, a dry-process film intended for scanning can be characterized as a light sensitive silver halide photographic recording material capable of forming a differentiable machine-readable image which includes a non-diffusible dye by the application of little to no processing solvent and a laminate layer, wherein the dry-process film or the laminate layer has an incorporated developer.

Suitable dry-process films and suitable components are described by Irving et al. in U.S. Ser. No. 09/475,510 filed Dec. 30, 1999, and by U.S. Pat. No. 6,048,110 to Szajewski et al.; U.S. Pat. No. 5,756,269 to Ishikawa et al.; U.S. Pat. No. 5,858,629 to Ishikawa et al.; U.S. Pat. No. 6,022,673 to Ishikawa; U.S. Pat. No. 5,888,704 to Kikuchi; U.S. Pat. No. 5,965,332 to Kikuchi; U.S. Pat. No. 5,851,749 to Okawa et al.; U.S. Pat. No. 5,851,745 to Takeuchi; U.S. Pat. No. 5,871,880 to Makuta et al.; U.S. Pat. No. 5,874,203 to Morita, et al.; U.S. Pat. No. 5,945,264 to Asami et al.; U.S. Pat. No. 5,976,771 to Kosugi et al. and U.S. Pat. No. 6,051,359 to Ohkawa et al.

The film intended for scanning can have long exposure latitude, at least 2.5 log E, preferably at least about 3.0 log E, more preferably at least about 3.5 log E and even more preferably at least about 4.0 log E. The long latitude facilitates proper capture of the total range of scene light levels under a variety of lighting conditions and illuminant types. The film can have a high sensitivity, preferably having an equivalent threshold sensitivity of at least about ISO 100, more preferably having an equivalent threshold sensitivity of at least about ISO 200 and most preferably having an equivalent threshold sensitivity of at least about ISO 400. Equivalent threshold sensitivities of about ISO 800 are useful in one-time-use cameras (OTUCs) based on 35-mm format film, and equivalent threshold sensitivities of up to about ISO 6400 are specifically contemplated. The high sensitivity further facilitates capture of scene light levels under poor lighting conditions of low illumination and when the scene subject is in motion, since the high sensitivity permits the use of a fast shutter time on a camera.

A film intended for scanning can be additionally characterized as having very distinguishable properties from films intended for optical printing or direct viewing. The film can form a low gamma image after development. The low gamma, especially when combined with the long latitude, ensures that the formed densities are easily scanned without the introduction of scanner electronic noise produced by scanning through high net density (density above the minimum density). Image gammas of up to about 0.7 are preferred, gammas of up to about 0.55 are more preferred and image gammas of up to about 0.45 are even more preferred. The film can exhibit a minimal gamma after development processing. Image gammas of about 0.2 are specifically contemplated. Certain methods of scanning allow an almost imperceptible image to be rendered into electronic image-bearing signals. Although a black-and-white film can be employed to facilitate some of the features of the invention, a color film can best exploit the full features of the present invention. When the film is a color film, it can have individual layer units each sensitive to red, green or blue light, such as the film intended for scanning described in EP-A-0 905 561 (published Mar. 31, 1999). Alternatively, the film can have layer units sensitive to white light and to specific subsets of white light as described in U.S. Pat. No. 5,962,205 to Arakawa et al. and U.S. Pat. No. 5,053,324 to Sasaki. While the layer units of a color film intended for scanning can be sensitized using any known color sensitization scheme, they are preferably sensitized in a manner that approximates the sensitivity of the human eye, which allows the accurate recording of scene light types as well as levels and which provides scene colorimetry. Since calorimetric capture requires linear space signal processing, it is incompatible with traditional chemical image processing practiced by color negative films intended for optical printing and color reversal films intended for direct viewing. Colorimetric recording is a desirable trait of films intended for scanning and electronic image processing, because image data with known color accuracy can be more manipulated to a much higher extent before color errors become objectionable, which in turn provides a larger range of possible image looks. A useful sensitization method, element and image-processing scheme for colorimetric capture is described in U.S. Pat. No. 5,582,961 to Giorgianni et al. More preferred spectral sensitizing dyes and methods for colorimetric recording emulsion sensitization are disclosed by EP-A-0 978 762 (published Feb. 9, 2000), which claims priority from U.S. Ser. No. 09/126,658, filed Aug. 5, 1998, and U.S. Pat. Nos. 6,093,526 and 6,143,482 to Buitano et al. Colorimetric-recording negative films especially useful in the practice of the invention are further described in U.S. Pat. No. 6,045,983 to Buitano et al., U.S. Pat. No. 6,146,818 to Gonzalez et al., and U.S. Ser. No. 09/259,694 filed Mar. 1, 1999.

When the film intended for scanning is a color negative film, it is preferably comprised of little or no colored masking coupler as described in U.S. Pat. Nos. 5,698,379 and 5,840,470 to Bohan et al., and U.S. Pat. No. 6,021,277 to Sowinski et al., the disclosure of which is herein incorporated by reference. Masking coupler is incorporated in a color negative intended for optical printing and performs a color correction step during chemical development. Elimination of the masking coupler provides for improved signal-to-noise characteristics during chemical development and obviates the need to electronically counteract its effect. In like manner, the film preferably exhibits low levels of interlayer interimage effects overall, since electronic signal processing will be relied upon for color correction and image structure enhancement. In a preferred embodiment, each layer unit of a color film will comprise less than about 0.02 mmole/m$^2$ of colored masking coupler. Since colored masking couplers are not required in color negative films intended for scanning, the processed film may be better adapted for visual appearance and inspection, in addition for scanning, as described in U.S. Pat. No. 5,972,585 to Sowinski et al.

It is conventional practice with color photographic recording materials used for printing or for direct viewing to have blue, green, and red light recording layer units contain yellow, magenta, and cyan image dye-forming couplers, respectively. In color photographic recording materials intended for scanning to produce three separate electronic color records, the actual hue of the image dye produced is of no importance. What is essential is merely that the dye image produced in each of the layer units be differentiable from that produced by each of the remaining layer units. To provide this capability of differentiation, it is contemplated that each of the layer units contains one or more dye image-forming couplers chosen to produce image dye having an absorption half-peak bandwidth lying in a different spectral region. It is immaterial whether the blue, green, or red recording layer unit forms a yellow, magenta, or cyan dye having an absorption half peak bandwidth in the blue, green, or red region of the spectrum, as is conventional in a color negative element intended for use in printing, or an absorption half peak bandwidth in any other convenient region of the spectrum, ranging from the near ultraviolet (300–400 nm) through the visible and through the near infrared (700–1200 nm), so long as the absorption half peak bandwidths of the image dye in the layer units extend in non-coextensive wavelength ranges. Preferably each image dye exhibits an absorption half-peak bandwidth that extends over at least a 25 (most preferably 50) nm spectral region that is not occupied by an absorption half-peak bandwidth of another image dye.

Light sensitive elements or films useful in the practice of this invention can be supplied in standard film cartridges or in thrust cartridges or cassettes, all as known in the art. Thrust cartridges are disclosed by U.S. Pat. No. 5,226,613 to Kataoka et al.; U.S. Pat. No. 5,200,777 to Zander; U.S. Pat. No. 5,031,852 to Dowling et al.; U.S. Pat. No. 5,003,334 to Pagano et al.; and U.S. Pat. No. 4,834,306 to Robertson et al. These thrust cartridges can be employed in reloadable cameras designed specifically to accept them, in cameras fitted with an adapter designed to accept such film cassettes or in one-time-use cameras designed to accept them. Narrow-bodied one-time-use cameras suitable for employing thrust cartridges are described in U.S. Pat. No. 5,692,221 to Tobioka et al. While the film can be mounted in a one-time-use camera in any manner known in the art, it is especially preferred to mount the film in the one-time-use camera such that it is taken up on exposure by a thrust cartridge. Film supplied in a thrust cartridge can be supplied in any convenient width. Widths of about 24 mm as employed in the Advanced Photo System™ (APS) are contemplated as well as wider formats, such as 35 mm or even wider.

Photographic recording materials intended for scanning that are particularly useful in the practice of the invention can be prepared by coating light sensitive silver halide emulsion units on a support with magnetic recording capability. Magnetic recording layers on film permit the encoding of information with specific images or with a the entire film roll, and they are described in *Research Disclosure* Item 38957, pages 626–627 (September 1996) Section XIV Scan facilitating features paragraph (2). *Research Disclosure* is a publication of Kenneth Mason Publications Ltd., Dudley House, 12 North Street, Emsworth, Hampshire PO10 7DQ England (also available from Emsworth Design Inc., 121 West 19th Street, New York, N.Y. 10011). Information useful in the practice of the invention can be exchanged between the film and the camera, the film manufacturer and the photofinisher, the customer and the film manufacturer, and so forth, as disclosed in U.S. Pat. No. 5,229,810 to Cloutier et al.; U.S. Pat. No. 4,987,439 to Cloutier; U.S. Pat. No. 5,027,140 to Cloutier; U.S. Pat. No. 5,130,745 to Cloutier et al.; U.S. Pat. No. 5,021,820 to Robison et al.; U.S. Pat. No. 4,965,626 to Robison et al.; U.S. Pat. No. 4,974,096 to Wash; U.S. Pat. No. 5,204,708 to Whitfield et al.; U.S. Pat. No. 5,029,313 to Robison et al.; U.S. Pat. No. 5,006,873 to Wash; U.S. Pat. No. 5,194,892 to Robison; U.S. Pat. No. 5,025,283 to Robison; U.S. Pat. No. 5,726,737 to Fredlund et al.; U.S. Pat. No. 5,609,403 to Bell et al. and U.S. Pat. No. 5,276,472 to Bell et al.

The exposed scan film can be received at a retail site such as a photo specialty store, a drug store, a department store, or a grocery store. The film can be deposited at a drop-off point, a kiosk, or mailed via the U.S. Postal Service using a mailer envelope. The customer can be presented with the option of choosing the photographic look that he desires for the planned images. In another embodiment, he customer can instead order a single default look from which to judge his images. The customer can order multiple image renditions derived from the same scene image, or he can order a single image per film frame wherein the look or characteristic appearance of the image is selected by the photofinisher, perhaps for optimum image quality based on scene content or photographic exposure, or perhaps based on a pricing structure. In a preferred embodiment of the invention, the customer can view imagettes (i.e., thumbnail images as used in a film order index print) displayed by a monitor screen through the Internet; in another embodiment, the imagettes are sent to the customer by e-mail for his examination before the full image data is processed. In yet another embodiment of the invention, the imagettes are displayed in real-time by a photographic processing kiosk. In still other embodiments, it is contemplated that the customer will have an option to select the images that he wishes to print or render for a fee, which can be referred to as a photo-select process. An example of such a selection methodology is described in U.S. Pat. No. 5,666,215 to Fredlund, et al. Especially suitable methods of digital photofinishing and image distribution involving a networked computer means are described in U.S. Pat. Nos. 6,017,157 and 6,133,985 to Garfinkle et al.

In step 102 (FIG. 1), it is preferred to assign a unique code to the customer photofinishing order. It is common practice in the photofinishing trade to supply an order number with a processing envelope in order to return the correct processed film and prints to a particular customer. An analogous strategy can be used with a processing kiosk. Other kinds of identifying codes can be present in the order. For example, the film cartridge or cassette can be encoded with an identifier for film type, processing conditions, film speed, or image processing requirements. In a similar fashion, the film can have a magnetically recorded encodement or a pre-exposed encodement, such as a bar-code on the edge of the film outside the frame area, to identify image processing requirements, manufacturer's correction factors, and so forth. The order identifier associated with the transaction can be used to facilitate the purchase of reprints or enlargements of particular frames, if the customer later desires. The order number can be associated with an index print, if provided, or with the customer's returned images in either hard copy or soft copy form. It is preferred to associate the order number with the digital file from the customer's order through the course of image processing and the completion of the transaction. A more permanent kind of identifying number can be assigned to a customer in order to process future orders. For example, a customer account can be established using a telephone number, an e-mail address, or a credit card number as a customer identifier, as illustrated in a representative Web page account generation process 700 shown in FIG. 3. During the course of the transaction, if the customer chooses a particular look, that choice can be stored along with the code number in the customer database. In this manner, a customer profile can be established, at the discretion of the customer. The customer code can be stored in the customer database and the identity of the customer's chosen look or preferences can be retrieved and associated with future purchases, if desired. In particular, if the customer has specific, permanent choices in mind, the processing envelope (or kiosk transaction) can be pre-endorsed with the chosen look(s) for future orders.

Referring now to step 106 of FIG. 1, it is determined which image look (or looks) are to be applied to the customer's input image data file prior to the completion of image processing in order to fulfill his order. In one embodiment of the invention, the customer chooses the particular look or looks for his image order. The customer can choose the particular look at the time of order placement for photofinishing following photography, and the processing envelope or mailer can be marked with the chosen look properties. Alternatively, the processing envelope can be pre-endorsed by the photofinisher based on customer preference data from prior usage of the service. In these circumstances, the looks selections are transmitted to the image processing equipment by codes or tags that have the customer order number associated with them. After photography, the customer has the option of changing the requested look by marking the processing envelope or mailer before returning it and the exposed film to the photofinisher. In another variation, the customer can record a preselected look on the film from a camera, before, during, or after image capture by using magnetic information storage such as found in Advanced Photographic System cameras, or by encoding a selection in an integrated circuit resident in a film cartridge or cassette. If the customer has a film camera with an associated auxiliary digital still capture device and display as disclosed in U.S. Pat. No. 5,777,677 to Miyake et al., such as a mounted LCD display or organic light emitting diode (OLED) display for instant image verification, then the customer can utilize an image looks menu for preview and display and make a selection at the time of image capture (or picture taking) for future order processing.

Figure 4A:
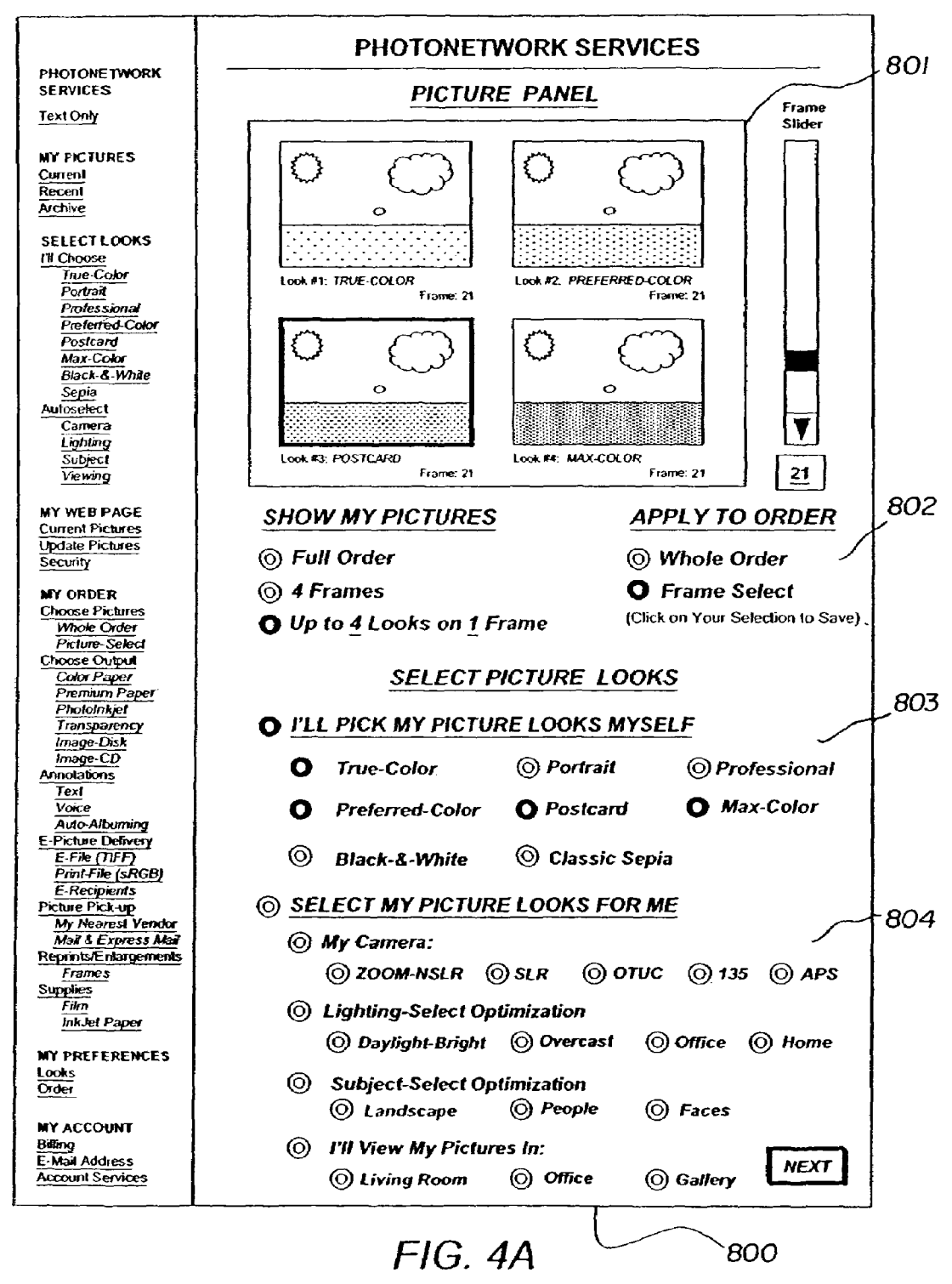

In another embodiment of the invention, the Internet can be used for order placement and image look selection. FIG. 4A shows an Internet WWW page 800, which displays the results (section 801) of applying various available looks to a customer's image, and which allows the customer to select the image look on a per-frame or whole-order basis (sections 802, 803). In the example of FIG. 4A, the customer has chosen to view up to 4 looks on one frame and to select their picture look themselves. These selections are then transmitted to the image processing equipment with the customer's order number. The customer may care to have additional information associated with his image, such as text, as disclosed in EP-A-0 851 661 (published Jul. 1, 1998) or U.S. Pat. No. 6,005,972 to Fredlund et al. and U.S. Pat. No. 5,986,671 to Fredlund et al., voice or musical annotations as disclosed in U.S. Pat. No. 5,774,752 to Patton et al. and U.S. Pat. No. 5,878,292 to Bell et al., or picture sequencing to form an electronic photo album as described in U.S. Pat. No. 5,574,519 to Manico et al., which is illustrated by the example WWW page 900 of FIG. 4B; such operations are conveniently recorded in the photofinishing order at this time.

In another embodiment of the invention and as a further example, the photofinisher or an algorithm selects the looks to be applied to the individual image frames based upon scene content, pictorial quality optimization, and so forth, as also suggested in section 804 of FIG. 4A. In this circumstance, the look determination can be performed by an algorithm that determines the properties of an individual image frame based on its image content. For example, a scene balance algorithm will provide color balance and density balance information for printing an image; it, or an image analysis algorithm, could also provide indications of scene content (i.e., the presence of sky, the presence of grass, the presence of a principal human subject, the presence of a face, the frame orientation, high lighting contrast (sunny day or electronic flash), low lighting contrast (overcast day), and so forth) upon which to base a selection of the optimum look in an automated fashion.

Referring to step 103 of FIG. 1, the customer's exposed scan film is chemically processed to produce a scanable image. In one embodiment of the invention, a full, conventional color process is carried out to provide a normal appearing, processed color negative film. In another embodiment of the invention, the chemical processing can be accelerated; the omission of tail-end processing steps such as washing is specifically contemplated. In yet another embodiment of the invention, the chemical processing can be limited to only a development step, which can involve aqueous processing chemicals or can alternatively involve thermal processing. A color photographic silver halide material comprised of a blocked but releasable photochemical (such as a blocked but releasable color developing agent) can be processed and used with the present invention. Such a material is disclosed for example in U.S. Ser. No. 09/475,510 filed Dec. 30, 1999 by Irving et al. The apparatus can be employed to process film in a free standing customer accessible kiosk as described in EP-A-0 234 833 (published on Sep. 2, 1987), U.S. Pat. No. 5,113,351 to Bostic, U.S. Pat. No. 5,627,016 to Manico and U.S. Pat. No. 5,664,253 to Meyers. For the purposes of this invention, photothermographic materials providing color images are considered to be within the definition of "color photographic recording materials intended for scanning". Color processing satisfying the requirements of the invention can also be accomplished by lamination methods, such as illustrated by U.S. Pat. No. 5,756,269 to Ishikawa et al.; U.S. Pat. No. 6,022,673 to Ishikawa and U.S. Pat. No. 6,030,755 to Matsumoto et al. Aerial deposition development methods associated with co-called electronic film development as described in U.S. Pat. No. 5,988,896 to Edgar and U.S. Pat. No. 6,017,688 to Edgar are also specifically contemplated, since such methods can be expected to perform especially well with films intended for scanning.

Satisfactory conventional color processing methods using conventional processing components, providing both color negative and color reversal images, are well known, as described for example, in Research Disclosure publication 308119, December 1989, publication 17643, December 1978, and publication 38957, September, 1996. Color developing compositions and processing conditions useful in rapid color development are disclosed for example in U.S. Pat. No. 5,118,591 to Koboshi et al.; U.S. Pat. No. 5,753,424 to Ishikawa et al. and U.S. Pat. No. 5,922,519 to Ishikawa et al. It is preferred to use a full color process with bleaching and fixing steps to provide color negatives intended for scanning that are free of retained silver metal and silver halide in order to improve scanning quality, but the invention can be practiced with any scanable, processed photographic recording material bearing an image. It is preferred, where appropriate to the requirements of the particular scan film, to use the KODAK FLEXICOLOR™ Process or C-41 Process, as described by *The British Journal of Photography Annual* of 1988, pp. 196–198. Another description of the use of the FLEXICOLOR™ Process is provided by Using Kodak Flexicolor Chemicals, Kodak Publication No. Z-131, Eastman Kodak Company, Rochester, N.Y.

Figure 5:
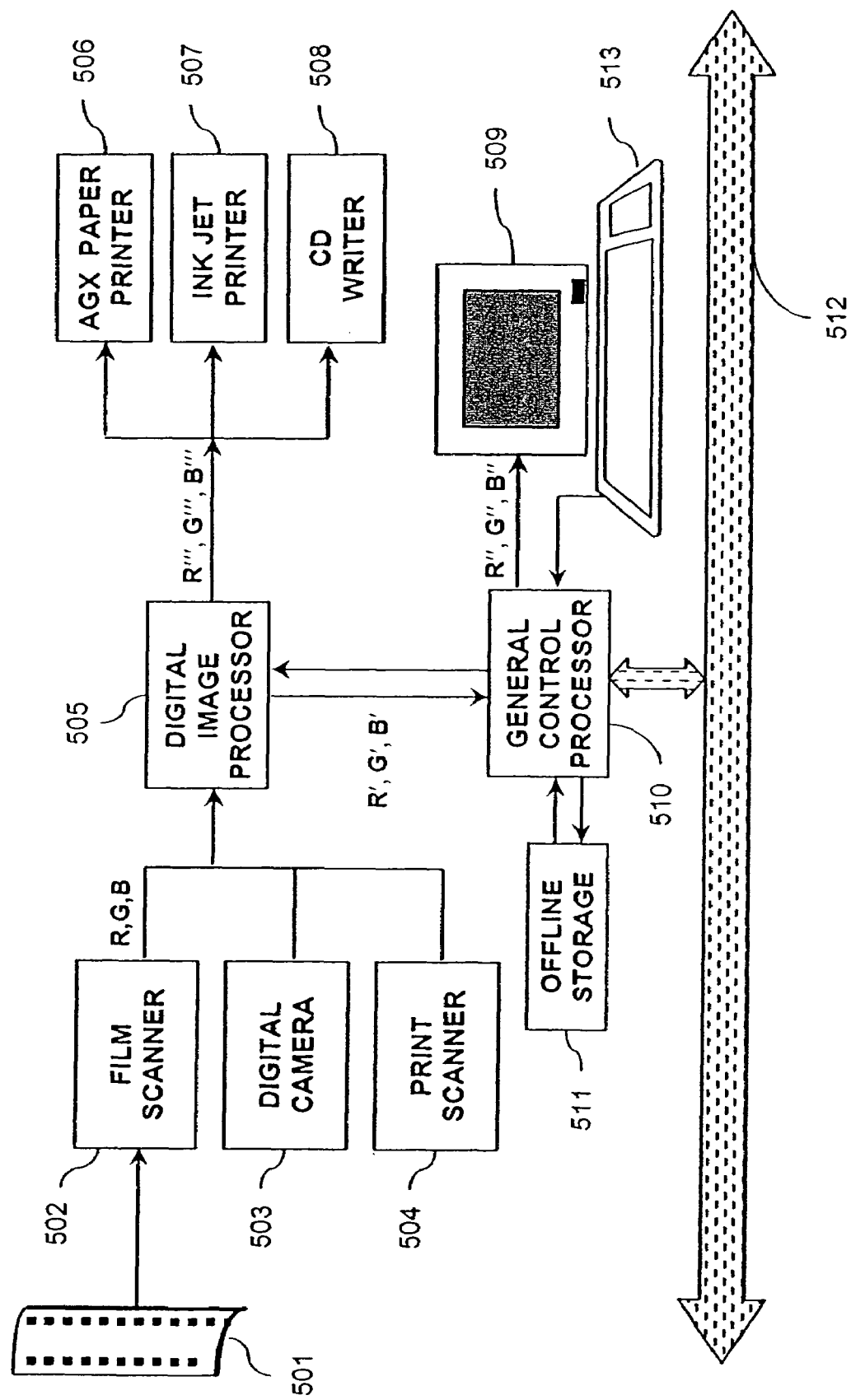
FIG. 5 is a block diagram showing a photofinishing system capable of accepting and processing images according to the present invention.

In step 104 of FIG. 1, the imagewise exposed and processed photographic recording material intended for scanning according to the invention is scanned. FIG. 5 shows, in block diagram form, a manner in which the recorded image information provided by the processed material can be used. A film scanner 502 is used to read processed scan film 501 by transmission; similarly, a reflection print scanner 504 or a digital still camera 503 can also provide data input into the image processing system. The scanning beam is most conveniently a beam of white light that is split after passage through the film layer units and passedthrough appropriate filters to create separate image records—red recording layer unit image record (R), green recording layer unit image record (G), and blue recording layer unit image record (B). Instead of splitting the beam, blue, green, and red filters can be sequentially caused to intersect the beam at each pixel location. In still another scanning variation, separate blue, green and red light beams, as produced by a collection of light emitting diodes, can be directed at each pixel location. As the element is scanned pixel-by-pixel using an array detector, such as an array charge-coupled device (CCD), or line-by-line using a linear array detector, such as a linear array CCD, a sequence of R, G, and B picture element signals are generated that can be correlated with spatial location information provided from the scanner. Signal intensity and location information is fed to a computer digital image processor 505 preferably associated with a general control processor computer workstation 510 and the information is transformed into intermediary image-bearing electronic signals R', G', and B', which can be stored in any convenient storage device associated with the general control processor workstation 510 or in off-line storage 511. Digital image processor 505 by means of general control processor workstation 510 can transmit information to and receive information from a computer network 512. It is preferred that the computer network be linked to the Internet, and more preferably to the World Wide Web.

A video monitor 509 which receives the digital image information modified for its requirements, indicated by R" G" and B", allows viewing of the image data information received and used by the workstation. Instead of using the cathode ray tube (CRT) of a video monitor, a LCD or OLED panel or any other convenient electronic display device can be substituted. General control processor apparatus 510 which can include a keyboard and pointing device such as a mouse or trackball 513 enables the workstation operator to provide image manipulation instructions for modifying the video image displayed and any image reproduction to be created from the image-bearing electronic signals.

Modifications of the image data can be viewed on video display 509 as they are being performed and then saved in storage device 511. The modified image data in suitable form R''', G''', and B''' can be sent to an output device to produce a hard copy scene reproduction for viewing. The output device can be any convenient conventional writing device, such as a CRT or laser silver halide color paper writer 506, a thermal dye transfer printer, an inkjet printer 507, an electrostatic, electrophotographic, or another type of printer. The modified image information can also be stored on a transportable recording medium such as a compact disc (CD) produced by a CD writer 508.

Figure 6:
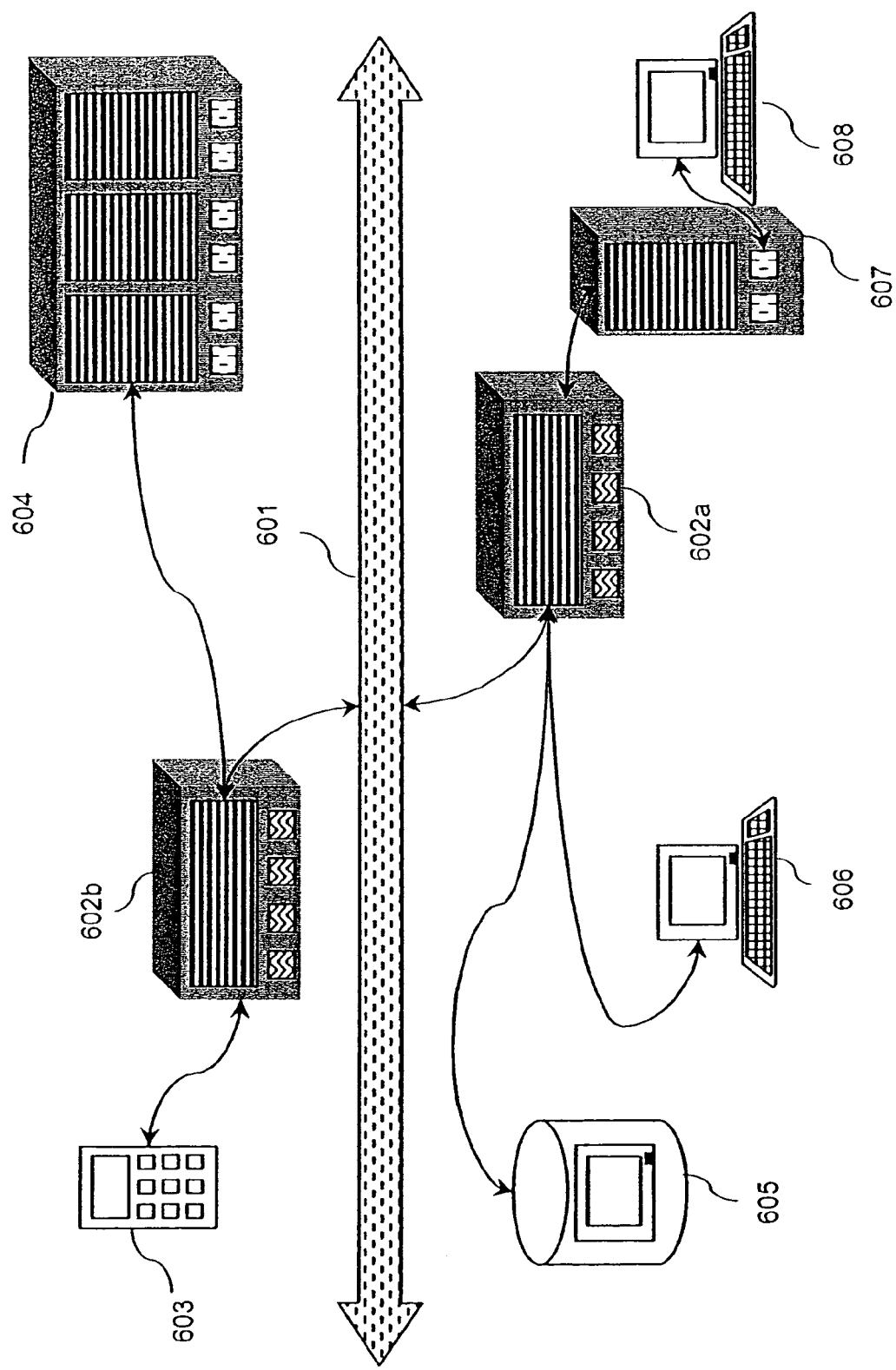
FIG. 6 is a block diagram showing a networked computer system capable of accepting and sending image data according to the present invention.

It is contemplated to connect the photofinishing image processing workstation of FIG. 5 to an extensive computer communications network as shown in FIG. 6. A workstation 607 with attendant operator input and output capabilities fulfilled by a keyboard and monitor display 608 can serve as a retail operation. In order to provide WWW interactive customer services, and to communicate with other photofinishing service operations, workstation 607 is linked through a connection computer, such as a server 602a, to a network 601. Through network 601 and another connection computer 602b, workstation 607 can communicate with wholesale photofinishing computer operations 604, to provide distributed image processing, storage, Web display, or printing services. The retail computer workstation can communicate with customers directly if desired through a personal computer 606, a kiosk 605, or through a mobile computer or computing device 603, such as a laptop computer, a personal digital assistant, or a cellular phone. Therefore, the present invention can take the form of a computer program product which includes a computer readable storage medium having a computer program stored thereon. The computer program product when loaded into a computer would cause the computer to perform the operation as described in the present application.

Further, the photofinishing can be accomplished by a kiosk system, a microlab system, a minilab system, or a high productivity wholesale photofinishing system, either in one location or in multiple locations with separate operations. Image data and other pertinent information may be input and output by reading and writing operations, respectively, from magnetic storage media or optical storage. Data, communications, billing, and so forth may be transferred by optical transmission means (e.g., direct infrared transmission or fiber optical network), or electromagnetic transmission means (e.g., wireless broadcast, Ethernet, cable or telephone line transmission).

Referring to step 104 in FIG. 1 again, once distinguishable images of one or more color records have been formed in the processed photographic materials, conventional techniques can be employed for retrieving the image information for each color record and manipulating the record for subsequent creation of a color-balanced, viewable image. As the element is scanned pixel-by-pixel using an array detector, such as an array CCD, or line-by-line using a linear array detector, such as a linear array CCD, a sequence of R, G, and B picture element signals are generated that can be correlated with spatial location information provided from the scanner. Scanning can also be carried out by a microdensitometer. Signal intensity and location information can be fed to an image data processor and the information is transformed into an electronic form, which can be stored in any convenient storage device. For example, it is possible to scan a color photographic material successively within the blue, green, and red regions of the spectrum or to incorporate blue, green, and red light within a single scanning beam that is divided and passed through blue, green, and red filters to form separate scanning beams for each color record. If other colors are imagewise present in the material, then appropriately colored light beams are employed. A simple technique is to scan the photographic material point-by-point along a series of laterally offset parallel scan paths. A sensor that converts radiation received into an electrical signal quantifies the intensity of light passing through the material at a scanning point. Most generally this electronic signal is further manipulated to form a useful electronic record of the image. For example, the electrical signal can be passed through an analog-to-digital converter and sent to a digital computer together with location information required for pixel (point) location within the image. In another variation, this electronic signal is encoded with colorimetric or tonal information to form an electronic record that is suitable to allow reconstruction of the image data into viewable forms such as computer monitor displayed images, television images, printed images, and so forth.

In motion imaging technologies, a common approach is to transfer the color negative film information into a video signal using a telecine transfer device. Two types of telecine transfer devices are most common: (1) a flying spot scanner using photomultiplier tube detectors; and (2) a CCD as a sensor. These devices transform the scanning beam that has passed through the color negative film at each pixel location into a voltage. The signal processing then inverts the electrical signal in order to render a positive image. The signal is then amplified and modulated and fed into a CRT monitor to display the image, and it is recorded onto magnetic tape for storage. Although both analog and digital image signal manipulations are contemplated, it is preferred to place the signal in a digital form for manipulation, since the overwhelming majority of computers are now digital and this facilitates use with common computer peripherals, such as magnetic tape, a magnetic disk, an optical disk, and a writing or printing device.

In another embodiment of the invention illustrated by step 105 of FIG. 1, the image data information acquired in preceding fashion from a film intended for scanning can be transmitted to the photofinisher's image processing workstation by a sending party, using any convenient method, such as a networked computer system. There is no requirement that the photofinisher scan the film in order to provide a selection of processed image reproduction appearances according to the invention. The sender can be a customer or a photographer possessing a home scanner and a modem who transmits an image file; the sender can also be a kiosk, a retail photo specialty shop, and so forth. While there is no requirement that the sender and the receiving photofinisher be at different locations, it is envisioned that the largest benefit is obtained when file transfers occur over appreciable distances associated with different locations due to the computer infrastructure requirements in establishing a network system. It will be appreciated that the best image processing results will be obtained if the transmitted image file has a data encodement or color encodement scheme consistent with that of the image processing scheme to ensure full compatibility. It is preferred that transmitted data be compressed in order to improve throughput in network communications where available bandwidth is limited or where there is congestion due to data traffic, as is common. When file compression means are used, it is preferred that they be lossless rather than lossy. It is highly preferred that transmitted data be accompanied by metadata encoding.

Within the context of the present invention, image metadata refers to any additional data or information associated with the image; it may be derivative of the image itself, or it may relate to added material that pertains to the event of photography, customer identification or preferences, or photofinisher routing information. Diverse examples of metadata and its encoding that are applicable to the invention can be found in U.S. Pat. No. 6,115,717 to Mehrota et al.; U.S. Pat. No. 5,893,101 to Balogh et al.; EP-A-1 004 967 (published on May 31, 2000); and U.S. Pat. No. 6,134,315 to Galvin. Photographic capture information that is desirably encoded as metadata includes any single input or any combination of inputs regarding scene illumination type, flash parameters such as flash output and/or whether the flash was directed at the subject or bounced onto the subject and/or whether sufficient flash power was available to properly illuminate the subject, camera lens f-stop, camera exposure time, and scene orientation, all of which is helpful in color and density balancing.

It is specifically contemplated to scan a developed image to red, green and blue light to retrieve imagewise recorded information and to scan the same image to infrared light for the purpose of recording the location of non-image imperfections. When such an imperfection or "noise" scan is employed, the signals corresponding to the imperfection can be employed to provide a software correction so as to render the imperfections less noticeable or totally imperceptible in soft or hard copy form. The hardware, software and technique for achieving this type of imperfection reduction is described in U.S. Pat. No. 5,266,805 to Edgar and WO 98/31142 (Edgar et al.), WO 98/34397 (Edgar et al.), WO 99/40729 (Edgar et al.) and WO 99/42954 (Edgar et al.). An example of a preferred scanner employing such corrections is the KODAK DLS Film Scanner 1640 with an associated image data manager, such as one or more dual-processor computers.

In another embodiment, the developed image can be scanned multiple times by a combination of transmission and reflection scans, optionally in the infrared and the resultant files combined to produce a single file representative of the initial image. Such a procedure is described in U.S. Pat. No. 5,465,155 to Edgar; U.S. Pat. No. 5,519,510 to Edgar; U.S. Pat. No. 5,790,277 to Edgar; and U.S. Pat. No. 5,988,896 to Edgar, as well as EP-A-0 944 998; WO 99/43148; WO 99/43149 and WO 99/42954. Improvements in the scanning of films that retain silver halide following a rapid development method, such as aerial chemical deposition, are obtained by methods disclosed in U.S. Pat. No. 6,069,714 to Edgar.

Elements having reference images or calibration patches derived from one or more uniform areas exposed onto a portion of unexposed photographic material as described in U.S. Pat. No. 5,649,260 to Wheeler et al., U.S. Pat. No. 5,563,717 to Koeng et al. and U.S. Pat. No. 5,644,647 to Cosgrove et al. can be usefully employed to overcome the effects of excessive sensitometric variation. The exposure of reference images for the purpose of better calibrating the image processing system can be performed by the photographic recording material manufacturer or by the photofinisher. Periodic system calibration events (e.g., a daily calibration) employing reference exposure patches even on a single representative material, such as those contained on a chemical process control strip, can lead to improved image processing results. It is preferred to employ a calibration reference image on every roll of film that is processed by the photofinisher. An especially suitable method for calibration and correction due to processing solution activity changes or film responsivity changes is taught in U.S. Pat. No. 5,667,944 to Reem et al., the disclosure of which is herein incorporated by reference. Other useful features of element construction for scanning and image-bearing signal manipulation can be found in *Research Disclosure,* publication 38957, pages 626–627 (September 1996) Section XIV Scan facilitating features.

Once acquired, the image data in electronic signal form derived from the input capture material or device color records can be adjusted for scene exposure conditions to produce a more pleasingly color-balanced and lightness—balanced image for viewing. An example of a suitable scene balance algorithm is described by. E. Goll, D. Hill, W. Severin, "Modem Exposure Determination for Customizing Photofinishing Printer Response", *Journal of Applied Photographic Engineering,* 2, 93 (1979). Techniques for transforming image-bearing signals after scanning are disclosed in U.S. Pat. No. 5,835,627 to Higgins et al., U.S. Pat. No. 5,694,484 Cottrell et al. and U.S. Pat. No. 5,962,205 to Arakawa et al. Techniques for color balance adjustments during scanning are disclosed in U.S. Pat. No. 5,049,984 to Moore et al. and U.S. Pat. No. 5,541,645 to Davis. Further illustrations of general procedures and system considerations involved in electronic image processing are described by Giorgianni and Madden, *Digital Color Management: Encoding Solutions,* Addison-Wesley, Reading, Massachusetts, 1998.

In order to deliver an image reproduction that incorporates one or more appearances selected by a customer or photofinisher, electronic signal processing (i.e., image processing) is carried out as indicated in step 107 of FIG. 1. Preferred techniques for transforming image-bearing signals after scanning are taught in U.S. Pat. No. 5,267,030 to Giorgianni et al.; U.S. Pat. No. 5,452,111 to Giorgianni et al.; U.S. Pat. No. 5,956,044 to Giorgianni et al., and U.S. Pat. No. 5,609,978 to Giorgianni et al., the disclosures of which are herein incorporated by reference. Another preferred method for transforming the image-bearing electronic signals, or carrying out image processing of a film intended for scanning, is taught by U.S. Pat. No. 5,995,654 to Buhr et al., and in U.S. Pat. No. 6,163,389 to Buhr et al., "Digital Photofinishing System Including Digital Image Processing of Alternative Color Capture Media".

Using an arrangement of the type shown in FIG. 5, the images contained in the color photographic recording material intended for scanning in accordance with the invention are converted to digital form, manipulated, and recreated in a viewable form following any of the suitable methods described in U.S. Pat. No. 5,276,030 to Giorgianni et al. In one preferred embodiment, Giorgianni et al. in '030 provide a method and means to convert the R, G, and B image-bearing signals from a transmission scanner to an image manipulation and/or storage metric which corresponds to the trichromatic signals of a reference image-producing device such as a film or paper writer, thermal printer, video display, etc. The metric values correspond to those, which would be required to appropriately reproduce the color image on that device. For example, if the reference image producing device was chosen to be a specific video display, and the intermediary image data metric was chosen to be the R', G', and B' intensity modulating signals (code values) for that reference video display, then for an input film, the R, G, and B image-bearing signals from a scanner would be transformed to the R', G', and B' code values corresponding to those which would be required to appropriately reproduce the input image on the reference video display. A data set is generated from which the mathematical transformations to convert R, G, and B image-bearing signals to the aforementioned code values are derived. Exposure patterns such as neutral and colored patches, chosen to adequately sample and cover the useful exposure range of the film being calibrated, are created by exposing a pattern generator and are fed to an exposing apparatus. The exposing apparatus produces trichromatic exposures on film to create test images, which include approximately 150 color patches.

Test images may be created using a variety of methods appropriate for the application. These methods include: using an exposing apparatus such as a sensitometer, using the output device of a color imaging apparatus, recording images of test objects of known reflectances illuminated by known light sources, or calculating trichromatic exposure values using methods known in the photographic art. If input films of different speeds are used, the overall red, green, and blue exposures must be properly adjusted for each film in order to compensate for the relative speed differences among the films. Each film thus receives equivalent exposures, appropriate for its red, green, and blue speeds. The image-wise exposed film is chemically processed to produce a dye image. Film color patches are read by a transmission scanner, which produces R, G, and B image-bearing signals corresponding to each color patch. Signal value patterns of the code value pattern generator produce R, G, and B intensity-modulating signals, which are fed to the reference video display. The R', G', and B' code values for each test color are adjusted such that a color matching apparatus, which may correspond to an instrument or a human observer, indicates that the video display test colors match the positive film test colors or the colors of a printed negative. A transform apparatus creates a transform relating the R, G, and B image-bearing signal values for the film's test colors to the R', G', and B' code values of the corresponding test colors.

The mathematical operations required to transform R, G, and B image-bearing signals to the intermediary data may include a sequence of matrix operations and look-up tables (LUTs).

In a preferred embodiment of the present invention, input image-bearing signals R, G, and B are transformed to intermediary data values corresponding to the R', G', and B' output image-bearing signals required to appropriately reproduce the color image on the reference output device as follows:

(1) The R, G, and B image-bearing signals, which correspond to the measured transmittances of the film, are converted to corresponding densities in the computer workstation used to receive and store the signals from a film scanner by means of 1-dimensional look-up table LUT 1.

(2) The densities from step (1) are then transformed using matrix 1 derived from a transform apparatus to create intermediary image-bearing signals.

(3) The densities of step (2) are optionally modified with a 1-dimensional look-up table LUT 2 derived such that the neutral scale densities of the input film are transformed to the neutral scale densities of the reference.

(4) The densities of step (3) are transformed through a 1-dimensional look-up table LUT 3 to create corresponding R', G', and B' output image-bearing signals for the reference output device.

It will be understood that individual look-up tables are typically provided for each input color. In one embodiment, three 1-dimensional look-up tables can be employed, one for each of a red, green, and blue color record. In another embodiment, a multi-dimensional look-up table can be employed as described in U.S. Pat. No. 4,941,039 to D'Errico. It will be appreciated that the output image-bearing signals for the reference output device of step 4 above may be in the form of device-dependent code values or the output image-bearing signals may require further adjustment to become device specific code values. Such adjustment may be accomplished by further matrix transformation or 1-dimensional look-up table transformation, or a combination of such transformations to properly prepare the output image-bearing signals for any of the steps of transmitting, storing, printing, or displaying them using the specified device.

In a second preferred embodiment of the invention, the R, G, and B image-bearing signals from a transmission scanner are converted to an image manipulation and/or storage metric which corresponds to a measurement or description of a single reference image-recording or image-capture device and/or medium and in which the metric values for all input media correspond to the trichromatic values which would have been formed by the reference device or medium had it captured the original scene under the same conditions under which the input media captured that scene. For example, if the reference image recording medium was chosen to be a specific color negative film, and the intermediary image data metric was chosen to be the measured R, G, and B densities of that reference film, then for an input color negative film according to the invention, the R, G, and B image-bearing signals from a scanner would be transformed to the R', G', and B' density values corresponding to those of an image which would have been formed by the reference color negative film had it been exposed under the same conditions under which the color negative recording material according to the invention was exposed.

Exposure patterns, chosen to adequately sample and cover the useful exposure range of the film being calibrated, are created by exposing a pattern generator and are fed to an exposing apparatus. The exposing apparatus produces trichromatic exposures on film to create test images which include approximately 150 color patches. Test images may be created using a variety of methods appropriate for the application. These methods include: using an exposing apparatus such as a sensitometer, using the output device of a color imaging apparatus, recording images of test objects of known reflectances illuminated by known light sources, or calculating trichromatic exposure values using methods known in the photographic art. If input films of different speeds are used, the overall red, green, and blue exposures must be properly adjusted for each film in order to compensate for the relative speed differences among the films. Each film thus receives equivalent exposures, appropriate for its red, green, and blue speeds. The imagewise exposed film is chemically processed to produce a dye image. Film color patches are read by a transmission scanner which produces R, G, and B image-bearing signals corresponding to each color patch and by a transmission densitometer which produces R', G', and B' density values corresponding to each patch. A transform apparatus creates a transform relating the R, G, and B image-bearing signal values for the film's test colors to the measured R', G', and B' densities of the corresponding test colors of the reference color negative film. In another preferred variation, if the reference image recording medium was chosen to be a specific color negative film, and the intermediary image data metric was chosen to be the predetermined R', G', and B' intermediary densities of step 2 of that reference film, then for an input color negative film intended for scanning according to the invention, the R, G, and B image-bearing signals from a scanner would be transformed to the R', G', and B' intermediary density values corresponding to those of an image which would have been formed by the reference color negative film had it been exposed under the same conditions under which the color negative recording material according to the invention was exposed.

Thus each input film calibrated according to the present method would yield, insofar as possible, identical intermediary data values corresponding to the R', G', and B' code values required to appropriately reproduce the color image which would have been formed by the reference color negative film on the reference output device. Uncalibrated films may also be used with transformations derived for similar types of films, and the results would be similar to those described.

The mathematical operations required to transform R, G, and B image-bearing signals to the intermediary data metric of this preferred embodiment may include a sequence of matrix operations and 1-dimensional LUTs. Three tables are typically provided for the three input colors. It is appreciated that such transformations can also be accomplished in other embodiments by employing a single mathematical operation or a combination of mathematical operations in the computational steps produced by the host computer including, but not limited to, matrix algebra, algebraic expressions dependent on one or more of the image-bearing signals, and n-dimensional LUTs. In one embodiment, matrix 1 of step 2 is a 3×3 matrix. In a more preferred embodiment, matrix 1 of step 2 is a 3×10 matrix. In a preferred embodiment, the 1-dimensional LUT 3 in step 4 transforms the intermediary image-bearing signals according to a color photographic paper characteristic curve, thereby reproducing normal color print image tone scale as one form of image look. In another preferred embodiment, LUT 3 of step 4 transforms the intermediary image-bearing signals according to a modified viewing tone scale that is more pleasing, such as possessing lower image contrast, as a second form of image look.

Buhr et al. in U.S. patent application Ser. No. 09/104,548 provide a related and even more preferred method of digital photofinishing comprising the steps of: producing a digital color image in printing or other densities of a color image captured on alternative capture photographic media (e.g., a color negative film intended for scanning); first mapping the printing or other densities of the alternative capture media to the printing densities that would have been obtained for reference color photographic media; processing the mapped digital color image with a scene balance algorithm to produce a processed digital color image; second mapping the processed digital color image through a hard copy media characteristic curve to produce the mapped digital color image mapped to print densities of the hard copy media; sharpening the mapped digital color image with a sharpening algorithm optimized to avoid unacceptable artifacts; and digitally printing the sharpened digital color image onto hard copy media. Information accompanying the captured original scene parameters that describes the camera parameters responsible for capturing the scene can provide useful input for the signal processing algorithms. Useful information includes any single input or any combination of inputs which includes scene illumination type, flash parameters such as flash output and/or whether the flash was directed at the subject or bounced onto the subject and/or whether sufficient flash power was available to properly illuminate the subject, camera lens f-stop, camera exposure time, and scene orientation. Further features in scene balance algorithms useful in the practice of the invention can include mixed illuminant detection and subject detection.

Thus, the scanner densities, the printing densities, or other film density-representative, image-bearing signals of the input scan film are transformed to image printing instructions or image display instructions based on the properties of a reference film. The reference film can be an existing film intended for the required output operation, or it can be another kind of film intended for a different imaging application if appropriate modifications are added to the image processing chain to account for the current application. It is preferred, in one embodiment of the invention, to transform the image-bearing signals of the scan film to known output printing or display instructions for existing color negative films. In this manner, the output derived from a scan film is simply predicted and conveniently image-processed. For example, the scanner densities or the printing densities from the imagewise-exposed and processed scan film can be transformed to the printing densities of a plurality of existing color negative films and then written to an output medium such as silver halide color paper. The scan film printing densities can be transformed to the printing densities of one or more of the following representative example films to satisfy the requirements of the invention, including, but not limited to: KODAK ROYAL GOLD™ films, KODAK GOLD MAX™ films,. KODAK GOLD™ films, KODAK MAX™ films, KODAK SUPRA™ films, KODAK VERI-COLOR™ films, KODAK PORTRA™ films, KODAK PRO GOLD™ films, KODAK FUNTIME™, KODAK VR™ films, KODAK EKTAPRESS PLUS™ films, EASTMAN EXR™ films, and KODAK ADVANTiX™ films. Alternatively, the scan film printing densities can be transformed to those of any other selected reference image capture device or medium, as described in U.S. Pat. No. 5,267,030 to Giorgianni et al. In a preferred embodiment, the reference image capture device is a digital still camera, more preferably one with spectral sensitivities that approximate the color matching functions or the human visual system.

In the general cases previously described, image recording media and devices, and scanning devices, will not directly record the scene parameters in the way human observers perceive them. However, all of these media and devices can be characterized by a spectral response function, by a function that maps scene intensity ratios to device code values and by a multi-dimensional function or matrix that characterizes the interdependence or cross talk between the at least three color channels. Therefore, obtaining the original scene parameters directly relating to the light levels of the scene (i.e., scene space exposures) involves applying transformations that are the inverses of these functions. It is desirable to make the captured scene parameters independent of the particular input device and/or medium and to make the resulting pixel values represent accurate estimates of the scene colorimetry. Scene colorimetry is a preferred intermediary data encoding metric, since a very wide variety of desirable image appearances can be derived by the proper manipulation of the image-bearing electronic signals. A most preferred method of providing scene exposures is described in U.S. Pat. No. 5,267,030 to Giorgianni et al., wherein a digital image that was created by scanning a film is transformed into a device-independent color space by a mathematical transformation. A data set from which the mathematical transformation can be derived is produced by exposing a sample of the film with a pattern of approximately 400 test color stimuli, chosen to adequately sample and cover the useful exposure range of the film. Red, green and blue (R, G, B) trichromatic exposures for a reference colorimetric image-capturing device or medium are then computed for the test stimuli, using standard calorimetric computational methods. The imagewise exposed film is chemically processed producing a dye image, and the color patches are read by a transmission scanner, which produces R, G, and B image-bearing signals corresponding to each color patch. A transformation is then created relating the R, G, and B image-bearing signal values for the film's test colors to the known R, G, and B trichromatic exposures of the corresponding test colors. This transformation is then used to convert digital image values that were produced by scanning a film of the type that was used to generate the transform using the following procedures:

1) converting the R, G, B image-bearing signals, which correspond to the measured transmittances of the input film, to R, G, and B densities by using appropriate 1-dimensional look-up-tables (LUTs);

2) adjusting the R, G, and B density-representative signals of step 1 by using a 3×3 matrix, to correct for differences among scanners in systems where multiple input scanners are used;

3) adjusting the R, G, and B density-representative signals of step 2 by using another matrix operation or 3-dimensional LUT, to remove the chromatic interdependence (i.e., cross talk) of the image-bearing signals produced by any unwanted absorptions of the imaging dyes and chemical interlayer interimage interactions in the input photographic recording medium, to produce channel independent, density-representative signals;

4) individually transforming the R, G, and B density-representative signals of step 3 through appropriate 1-dimensional LUTS, derived such that the neutral scale densities of the input film are transformed to the neutral scale linear exposure-representative signals of that film; and 5) further transforming the R, G, and B exposure-representative signals of step 4 by another matrix operation to arrive at the R, G, B scene exposure-representative signals corresponding to those which a reference image-capturing device or medium would have received if it had recorded the same original scene (i.e., scene space colorimetry).

Test color patch sets having fewer than 400 colors can be employed to enable more efficient generation of the transformation matrices and LUTs and improved use of computational resources. In some embodiments, the mathematical operations represented by sequential application of individual matrices and LUTs can be numerically concatenated to afford improved computational speed and to reduce the necessary computational power. Analogous procedures can be employed to generate transformation matrices and LUTs appropriate for use with the other photographic or electronic image capture, image acquisition, and image processing paths described herein.

It will be appreciated that the scene space exposures determined in the aforementioned manner are limited in accuracy by the accuracy of the spectral sensitivities of the photographic recording medium or device whose input recorded image data was transformed. Hence, the earlier noted preference for calorimetric capture to the practice of the invention, in order to provide the broadest range of useful image reproduction appearances.

Instead of direct capture of the original scene parameters, it is also possible to access a representation of the original scene parameters, captured and stored at some prior time. These representations may be two-dimensional or three-dimensional and may be of still or moving scenes. The only requirement for this means of generating a preferred viewed reproduction of the original scene is that the relationship between the original scene parameters and those in the accessed original scene representation be known or that it be possible to make an accurate assumption about this relationship. The accessed scene representation was at some point captured preferably using the methods described above for direct original scene parameter capture.

It is preferred to encode the scene exposures derived in the above manner, or by another method, in a device-independent color space for further manipulation and for eventual transmission to a device-dependent color space for display, printing, transmission, storage and so forth. Device-independent color spaces are often based on a system of colorimetry developed by the Commission International de l'Eclairage (CIE), and representative examples are CIE XYZ and CIELAB color spaces. A comprehensive discussion of colorimetry and color standards can be found in R. W. G. Hunt, "The Reproduction of Color in Photography, Printing and Television, Fifth Edition", Fountain Press, Kingston, upon-Thames, England, pp. 136–176 (1995). A specification for its well-known color spaces can be found in CIE Publication 15.2-1986, "Colorimetry, Second Edition". Output device-dependent color spaces can also be used for storage, interchange, and manipulation of digital images, but they frequently produce a compromise in color storage due to a limited functional range or color gamut that necessitates truncation of the colors or luminance ranges that can be reproduced by the system. An example of a suitable, contemporary device-dependent color space is sRGB. If a limited gamut color-encoding medium is used, the possible loss of recorded scene data may be ameliorated by the use of the method involving image metadata described in EP-A-0 991 019 (published Apr. 5, 2000) and the use of the apparatus described in EP-A-0 991 020 (published Apr. 5, 2000). A preferred interchange space comprised of a device-independent color encoding specification for the practice of the invention is Profile Connection Space (PCS) as defined by the International Color Consortium® (ICC), a group of participating corporations that has set open specifications for electronic device color management. The PCS interface represents color appearances by specifying the CIE colorimetry of colors viewed on a reference medium in a reference viewing environment. A device profile (often called an ICC profile) is used to relate the device-dependent code values of an input or output image data set to the corresponding color encodement scheme values in PCS. ICC has published a description of both PCS and device profiles in "File Format for Color Profiles," Specification ICC. 1:1998-09, and in "Addendum 2 to Spec. ICC. 1:1998-09," Document ICC. 1A:1999-04, which are quite readily obtained by downloading from the ICC website, www.color.org. However it is preferred to store the intermediary image-bearing electronic signals representing scene exposures or manipulated scene colorimetry in a large-gamut color-encoding scheme suitable for image manipulation operations. Preferred input and output color encoding schemes and interchange methods are described by K. Spaulding, G. Woolfe, and E. Giorgianni in *IS&TPICS Conference Proceedings,* pp. 155–163 (2000). An especially preferred device-independent color encoding space described therein is termed Extended Reference Input Medium Metric (ERIMM).

Additional illustrative systems for manipulation of digital signals including techniques for maximizing the quality of image records are disclosed by U.S. Pat. No. 4,553,156 to Bayer; U.S. Pat. No. 4,591,923 to Urabe et al.; U.S. Pat. No. 4,631,578 to Sasaki et al.; U.S. Pat. No. 4,654,722 to Alkofer; U.S. Pat. No. 4,670,793 to Yamada et al.; U.S. Pat. No. 4,694,342 to Klees; U.S. Pat. No. 4,962,542 to Klees; U.S. Pat. No. 4,805,031 to Powell; U.S. Pat. No. 4,829,370 to Mayne et al.; U.S. Pat. No. 4,839,721 to Abdulwahab; U.S. Pat. No. 4,841,361 to Matsunawa et al.; U.S. Pat. No. 4,937,662 to Matsunawa et al.; U.S. Pat. No. 4,891,713 to Mizukoshi et al.; U.S. Pat. No. 4,912,569 to Petilli; U.S. Pat. No. 4,920,501 to Sullivan et al.; U.S. Pat. No. 5,070,413 to Sullivan et al.; U.S. Pat. No. 4,929,979 to Kimoto et al.; U.S. Pat. No. 4,972,256 to Hirosawa et al.; U.S. Pat. No. 4,977,521 to Kaplan et al.; U.S. Pat. No. 4,979,027 to Sakai et al.; U.S. Pat. No. 5,003,494 to Ng; U.S. Pat. No. 5,008,950 to Katayama et al.; U.S. Pat. No. 5,065,255 to Kimura et al.; U.S. Pat. No. 5,051,842 to Osamu et al.; U.S. Pat. No. 5,012,333 to Lee et al; U.S. Pat. No. 5,107,346 to Bowers et al.; U.S. Pat. No. 5,105,266 to Telle; U.S. Pat. No. 5,105,469 to MacDonald et al.; U.S. Pat. No. 5,081,692 to Kwon et al.; and U.S. Pat. No. 5,579,132 to Takahashi et al.

It is appreciated by those skilled in the art that scene colorimetry does not produce a pleasing image when directly rendered as a reproduction, such as a color print. Furthermore, in order to achieve the objectives of the invention, it is necessary to manipulate the encoded scene exposures or scene colorimetry, or other form of image data, in a plurality of ways in order to allow a selection and provision of at least two or more looks. Individuals differ in their preference for appearance characteristics of image reproductions. An image "look" can be defined by characterizing the appearance of the reproduction relative to the appearance of the original scene. For example, the reproduction tone scale quantifies the mapping of the tones in the original scene to the tones in the reproduction. A three-dimensional color space mapping can be used to quantify the modification of the hues, saturations, and lightnesses of the colors in the original scene necessary to produce the image reproduction of the scene. Additional global characteristics of the reproduction that define the look include sharpness and graininess, pertaining to image spatial frequency reproduction and noise content, respectively. In addition to global image characteristics, object- or region-specific image adjustments may be made to produce the desired "look". An example of an object-specific adjustment is to transform all non-skintones into B&W tones. An example of a region-specific image adjustment is to darken the edges of an image to produce a vignetting effect.

It is well understood by those skilled in the art that image colorimetry can be purposefully manipulated in a variety of ways to achieve changes in image luminance, chroma, and hue, which then can be rendered in the image reproduction by means of subsequent well-known transformations. In this manner, the scene can be reproduced with higher or lower contrast and brightness (which equates to higher or lower scene luminance reproduction (i.e., lightness)), with higher or lower colorfulness (i.e., chroma), and with more accurate or less accurate color shades (i.e., hue). It is the aggregate of the specific hue reproduction, chroma reproduction, lightness reproduction or rendering contrast (tonal reproduction) in a particular pictorial reproduction that defines a distinguishable image look. A highly preferred method for transforming the intermediary image-bearing electronic signals representing scene exposures is by calorimetric manipulations that can take the form of consistently and smoothly shifting colors within a region of color space, so as to deliver an image that incorporates the look selected by a customer or a photofinisher, which is disclosed in U.S. patent application Ser. No. 09/506,712, to Buhr et al. filed on Feb. 18, 2000, entitled 'Color Reproduction of Scenes with Preferential Color Mapping', and in U.S. patent application Ser. No. 09/540,807 filed Mar. 31, 2000, to Woolfe et al. entitled 'A Color Transform Method for the Mapping of Colors in the Images'.

By using the above methods of image processing taught by Buhr et al. and Woolfe et al. in the aforementioned references, the image-bearing electronic signals representing the captured scene can be purposefully manipulated by a photofinisher to achieve a very wide variety of visual reproductions. Thus it is possible to make the pictorial reproduction more or less colorful, or to remove color entirely and reproduce color image data as a black-and-white reproduction. The method of Buhr et al. allows specific colors to be manipulated with minimal or no effect at all on other colors in the reproduction. The chroma of green relating to grass and blue relating to sky can be increased, while the chroma, hue and lightness of skin colors can remain unaffected. Such discretion in color reproduction manipulation is beyond the capability of the conventional optical print system, which relies on film chemical interlayer interimage effects to produce system wide color correction and color management. A variety of tonal mappings can be applied, to manipulate visual reproduction contrast in ways also not feasible in the optical print system. Specific colors hues can be shifted, for example by adding blue to the green of foliage to produce a more pleasing color reproduction. It is preferred to render mid-tone neutrals with lower contrast than normally used in the color negative optical print system, especially with high-key scenes. It is preferred to increase the chroma of highly saturated scene colors in the reproduction without affecting skin colors, and without resorting to overall high contrast. It is preferred to smoothly and consistently shift the hue of foliage colors by a desirable hue angle rotation.

In addition to the hue and chroma manipulations listed above, a tone scale has to be applied to map the relative luminance values of scene colors to relative luminance values of the reproduced colors. It is well known to those skilled in the art that this is rarely a one-to-one mapping. The selection of a tone scale that produces the most preferred images depends on a variety of factors, including the discrepancy between viewing conditions of the scene and the reproduction, anticipated subject matter (e.g., portrait photography, nature photography, landscape photography, candid shots, etc.), the dynamic range of the scene in relation to the dynamic range that can be reproduced, and viewer preferences.

A family of tone scales that produce preferred reproductions in combination with hue and chroma manipulations, are disclosed in U.S. Pat. No. 5,300,381 to Buhr et al; U.S. Pat. No. 5,447,811 to Buhr et al.; and in the previously cited U.S. Pat. No. 5,528,339 to Buhr et al. However, the invention is not limited to these tone scales which are characterized by a linear relationship between scene lightness and lightness as perceived by the viewer. Traditional S-shaped tone scales, which are mostly used in conventional silver halide photography, produce preferred images within the framework of this invention compared with optical printing systems, because of the large improvements in hue reproduction possible following purposeful manipulation of scene exposure data derived in the manner of U.S. Pat. No. 5,267,030 in an appropriate color space prior to outputting. It is more preferred to adopt a rendering contrast with reduced gradient in the important midscale densities corresponding to flesh colors compared with the usual tonal mapping of optical print-through systems to color paper. When adjusting the contrast of an image in the form of electronic signals, it is preferred to preserve image detail by the application of spatial filtering as described in EP-A-0 971 314 (published Jan. 12, 2000).

The best results are obtained if a particular tone scale, or a family of tone scales, is combined with a classification algorithm that selects the most appropriate tone scale according to the dynamic range of the scene or if a dynamic range adjustment is applied prior to tone scaling. Successful classification algorithms will take many forms, including but not limited to histograms, ranges, parameters based on the distribution, or transformations of the distribution of all or a subset of the recorded or transformed image pixel values. In digital imaging printing systems, classification algorithms can be implemented to select slightly different tone mappings to create the most preferred images. The input for the classification can be scene parameters or capture conditions. Information accompanying the captured original scene parameters that describes the camera parameters responsible for capturing the scene can provide useful input for the signal processing algorithms. Useful information includes any single instance of or any combination of scene illumination type, flash parameters such as flash output and/or whether the flash was directed at the subject or bounced onto the subject and/or whether the sufficient flash power was available to properly illuminate the subject, camera lens f-stop, camera exposure time, scene orientation and zoom lens status. Such classification algorithms are also useful in automating the selection of optimal image looks by a photofinisher to provide to a customer in an automated method of photofinishing, in another aspect of the invention. In combination with the hue and chroma manipulations, lightness manipulations can take any of the following forms: applying a scene-dependent tone scale transformation, applying a global scene-independent tone scale transformation, or applying a global scene-dependent or scene-independent tone scale transformation. In one aspect, the invention is directed at providing a selection of image looks suitable for viewing a scene reproduction in a variety of viewing illumination environments. A method for producing color-appearance matching for an image viewed in different surround conditions by the application of appropriate image luminance contrast factors is described by U.S. Pat. No. 6,046,723 to Daniels et al.

Figure 7:
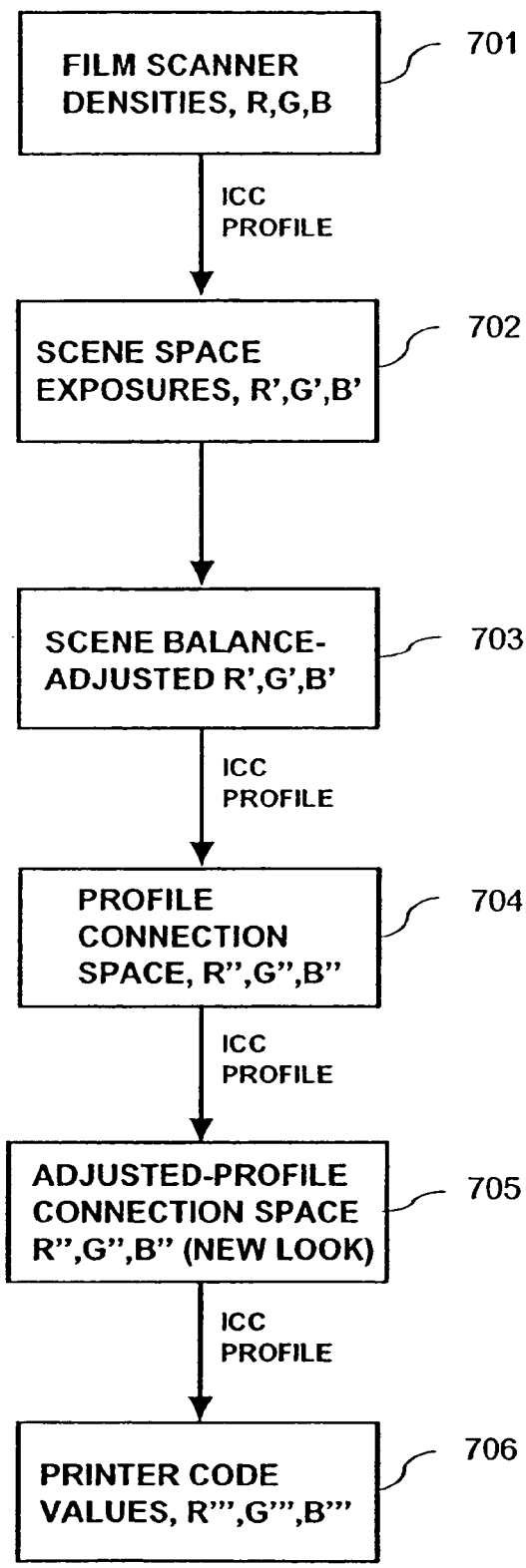
FIG. 7 is a block diagram showing a preferred method of electronic signal processing of input image-bearing signals from scanning to form output image-bearing signals for printing that have been modified in accord with a selected appearance.

A preferred method of implementing the image processing method of Giorgianni et al. in U.S. Pat. No. 5,267,030 and Buhr et al. in U.S. patent application Ser. No. 09/506,712, to provide multiple image reproduction appearances is shown in FIG. 7. In step 701, a film intended for scanning is scanned producing image-bearing electronic signals R, G, and B, preferably in the form of scanner densities. An ICC profile is used to convert the density-representative signals into scene space exposure-representative signals encoded in a suitable colorimetric space R', G', and B', in step 702. As described previously, ICC has published a description of both PCS and ICC device profiles in "File Format for Color Profiles," Specification ICC. 1:1998-09, and in "Addendum 2 to Spec. ICC. 1:1998-09, " Document ICC. 1A:1999-04. The exposure-representative signals are adjusted for color bias and intensity using a scene balance algorithm in step 703. An ICC profile transforms the balanced exposure-representative signals R', G', and B' into the device-independent colorimetric encoding specification of (PCS) R'', G'', and B'' in step 704. It is convenient to provide a plurality of different image looks by applying a plurality of different ICC profiles in PCS space. In step 705, modified PCS space image-representative signals with the intended properties of the selected image look are produced by the application of the appropriate ICC profile from an available group of look-application profiles. It is preferred that the PCS space image-bearing signals R'', G'', and B'' produced in step 704 are an accurate color or colorimetric representation of the photographed scene rather than a calorimetrically inaccurate, more viewer-preferred representation. Increased simplicity in managing an inventory of appearance profiles is afforded by basing individual appearance profiles on changes to output scene colorimetry, which is unchanging; thus image look profiles can be added and removed from the digital photofinishing system with minimum inconvenience. In step 706, an ICC profile transforms the image-bearing electronic signals of PCS color interchange space into device-dependent code values with the applied image look R''', G''', and B''' appropriate for printing or other end uses as determined by the output profile selection.

Thus, for the provision of a plurality of looks to a customer by a photofinisher, either of the two previously described methods is suitable to produce differentiable image appearances in the output image files: (1) the method of Buhr in U.S. patent application Ser. No. 09/104,548 involving the use of printing density transformations wherein scanning and image processing spectral responsivities match those of a particular optical photographic printer and photographic output medium (e.g., densitometric encoding); or (2) the method of Giorgianni in U.S. Pat. No. 5,267,030, wherein density-representative signals are rendered channel independent and converted to scene exposure-representative signals prior to colorimetric manipulation of hue, chroma, and lightness (e.g., colorimetric encoding). One of the two image processing methods and means can be used separately to provide all of the image looks, or the methods may be used jointly, each method providing one or more of the output looks, preferably from a single acquisition of data by scanning the input medium, to provide the multiplicity of image looks. It is preferred to use the method of the U.S. Pat. No. 5,267,030 patent to produce scene space exposure-representative electronic signals to provide at least one of the looks. It will be appreciated that the methods of providing image looks are not limited to the procedures described in '030 of Giorgianni et al. or in '548 of Buhr et al., but any suitable method of image processing that provides differentiable visual reproductions can be used in the invention.

It is within the scope of the invention to provide two differentiable looks for a film intended for scanning. It is preferred to provide at least three image looks. It is most preferred to provide up to five image looks, but there is no limit on the number of looks that can be offered. An especially preferred combination of looks is a black-and-white rendition, a portraiture rendition (e.g., lower chroma, lower contrast, and lower sharpness), a general or basic default rendition (e.g., high chroma, intermediate contrast, high sharpness), and a high colorfulness rendition (e.g., very high, chroma, high contrast, and high sharpness). It is preferred for the photofinisher to impart color and tone rendition properties that are unavailable through the usual optical print system in at least one of looks in order to provide visually superior digital output. It is more preferred for the photofinisher to provide at least two preferred color and tone looks, neither of which are produced by direct printing density transformations or by the optical print system. Altering the image spatial signal processing, for example to increase sharpness (e.g., for a landscape), or to decrease sharpness (e.g., for a portrait), constitutes a differentiable image look according to the invention even if the color and tone reproduction properties are otherwise unaltered. Color image reproductions can be supplemented with black-and-white reproductions as differentiable looks, with monochrome reproductions, with simulations of historical prints hues such as sepia or brown-toned, or other unnatural reproductions of the captured scene. In another aspect of the invention, cartoonization can constitute one or more of the provided looks. Cartoonization can be made to render the input image to appear like a child's coloring book images, like impressionistic oil paint images, like rasterized color images, like quantized digital color images showing contouring effects, like sidewalk chalk pastel images and so forth. In addition to color manipulation, texture (e.g., patterns) can be applied to the image as well. Of course, captions, labels, dates, text boxes, and other kinds of information can be attached to the image data or the output reproduction in printed or other form.

The last step in FIG. 1 is to produce a visual reproduction of the image in step 108 or to transmit a modified image file to a recipient in step 109 that was processed according to the specifications in steps 106–107. The image can be reproduced on any transparent or reflective material (hard copy) or on a self-luminous display (soft copy) that produces images by additively mixing at least three suitably chosen primary colors or by subtractively mixing at least three suitably chosen dyes.

A digital, electronic representation of the manipulated image is transformed into an analog signal of the correct intensity and spectral distribution in order to generate the desired visual reproduction of the manipulated image. Reproduced images may be displayed in two- or three-dimensional form. Examples of this procedure include the display of an image on a color monitor or an electronic printing process whereby a color photographic paper receives an image-wise exposure by a CRT or laser printing device and the material is subsequently chemically processed, for example by KODAK EKTACOLOR™ RA-4 Process, to produce a reflection print.

The electronic signals representing the selected image reproduction resulting from applying steps 104–107 of FIG. 1 must be transformed into a corresponding set of device code values to account for the scene parameter manipulation characteristics of the output device and media in step 108. The transformation between device code values and the colorimetry of the colors reproduced by a particular device/media combination can be obtained by a device characterization. An example of a device characterization is a procedure that involves generating and printing or displaying a suitable array of device code values in the form of color patches of a size large enough for subsequent measurement. These patches can be measured using a colorimeter, a spectrophotometer or a telespectroradiometer, depending on the nature of the output, such as for example, a silver halide color paper reflection print, or an inkjet reflection print. If monitor display output spectra are measured, CIE XYZ tristimulus values and other related quantities such as CIELAB or CIELUV color space coordinates can be calculated for the display illuminant using standard calorimetric procedures. This data set can be used to construct the appropriate sequence of one-dimensional look-up tables, multidimensional look-up tables, matrices, polynomials and scalars that accomplish that transformation of the image-bearing electronic signals derived from step 107 of FIG. 1 into a set of device code values that produces the desired visual reproduction of the scene. A preferred example of the implementation of this transformation is an ICC-type profile that maps the specifications of the desired visual reproduction, encoded in a color interchange space such as PCS, to device code values, the actual machine printing or monitor display instructions.

This operation may also include gamut mapping. The color gamut of the scene representation at the end of step 107 of FIG. 1 is determined by the set of primaries that was used for encoding the data. Examples include the primaries corresponding to the color-matching functions of the CIE 1931 Standard Colorimetric Observer or any linear combinations thereof. Gamut mapping is performed between the gamut defined by this encoding and the gamut of the combination of the output device and the output media, in the case of a reflection print. It is preferred to use gamut-mapping algorithms that maintain color hue, in practice of the invention.

The image data transformation of step 108 can be combined with any of the transformations in step 107 to form a single set of one-dimensional look-up tables, multidimensional look-up tables, matrices, polynomials and scalars in any sequence. Reproductions according to the specifications of the invention can be produced by a variety of technologies. Reproductions can be obtained on silver halide or other light-sensitive materials. The light-sensitive material can be transparent film, reflection print paper, or semi-transparent film. These materials are exposed by visible or infrared light derived from many different sources. The materials may be designed for typical photofinishing applications or they may be specially designed for digital printing applications. The photosensitive materials respond primarily to three different spectral regions of incident light. Typically, these are red (600–720 nm), green (500–600 nm), and blue (400–500 nm) light. However, any combination of three different spectral sensitivities can be used. These could include green, red, and infrared light or red, infrared 1, and infrared 2 light, or 3 infrared lights of different wavelengths. Or a material sensitive to the three primary wavelengths of visible light may be false sensitized so that the color of the exposing light does not produce image dye of the complementary hue, such as red, green, and blue sensitivity producing magenta, yellow, and cyan dye, respectively. Printing can be carried out by exposing all pixels sequentially, by exposing a small array of pixels at the same time, or by exposing all the pixels in the image at the same time.

Devices, which can be used to print on light-sensitive materials, include CRT, light emitting diode (LED), light valve technology (LVT), LCD, laser, as well as any other controlled optical light generating device. All these devices have the ability to expose 3 or more light-sensitive layers in a light-sensitive material to produce a colored image. They differ mainly in the technology on which the devices are based. A suitable embodiment of a CRT printer is the KODAK PROFESSIONAL Digital Multiprinter, which can be used in combination with KODAK PROFESSIONAL Digital III Color Paper.

Non-light-sensitive imaging materials are conveniently used by electronic printing processes to produce high-quality reproductions. The method of image formation can be half-tone, continuous tone, or complete material transfer. The image reproduction material can be transparent film, reflective paper, or semi-transparent film. The media can be written on to produce pictorial images by thermal dye transfer, inkjet, wax, electrophotographic, or other pixelwise writing techniques. These processes use three or more colorants to create colored pictorial representations of pictorial scenes. The colorants may be dyes, toner, inks, or any other permanent or semi-permanent colored material. A suitable example of a dye transfer thermal printer is the KODAK PROFESSIONAL XLS 8650R Thermal Printer. Both non-impact and impact printing methods, such as traditional press methods, are specifically contemplated.

In addition to hard copy viewed images, it is also possible to create projected images, which have the differentiable image looks in accordance with the invention. Many technologies are appropriate for this kind of image generation. All these techniques rely on producing color images with two or more colored lights. These are typically red, green, and blue in nature although they can be any set of primaries. Devices, which can be used to create the preferred viewed reproduction, include CRT, LCD, electro-luminescence (EL), LED, OLED, light bulbs, lasers, plasma display panels, or any other three or more colored lighting apparatus capable of pixel wise illumination. The images can be created by display within the device, projection, or backlighting. Many devices create an image on a screen or display area, which is physically a part of the mechanical unit. However, images can also be created by optically projecting the image in the form of light rays from behind or in front of the viewer toward a screen, which is in front of a viewer, or by projecting a reversed image toward the viewer onto a screen between the viewer and the projecting device.

It is within the scope of the invention to transmit processed image-bearing signals to an intended recipient as in step 109 of FIG. 1 in accordance with steps 101–107 to enable digital motion imaging projection. A motion imaging data file (e.g., a digital electronic movie) can be constructed by scene capture and reproduction from a film intended for scanning with multiple characteristic appearances applied on a frame-by-frame or on a scene-by-scene basis to create associated multiple preferred scene reproductions suitable for broadcast and wide-format display as in a movie theater or home display, as on a television set.

Image data storage can be accomplished in a variety of ways, including magnetic, optical, magneto-optical, RAM, biological, solid state, or other materials, which permanently or semi-permanently record information in a retrievable manner. Examples of suitable storage media and devices include computer hard drives, floppy disks, writeable optical disks such as KODAK PHOTO CD™ Discs, KODAK PICTURE CD Discs, KODAK Picture Disk Media, and flash EEPROM (Erasable Electrically Programmable Read-only Memory) PCMCIA cards. Image data transmission can be accomplished most effectively by high throughput means including the use of optical and electromagnetic transmission technologies.

The following concrete examples are provided for illustrative purposes, and are not to be intended to be limiting in any way.

In a first example, a customer purchases a package comprised of color photographic film intended for scanning and a processing mailer envelope for directed photofinishing from a retail photospecialty shop. The packaging indicates that the photofinishing service provides a selection of available image appearances, and sample images with exaggerated differences and with descriptive labels appear on the packaging. The mailer envelope has check-off boxes associated with the descriptive names for the different appearance selections, and the usual customer identification, billing, and shipping information inputs (see. FIGS. 2A and 2B). After exposing the roll of film intended for scanning, the customer ships the film to the photofinisher in the mailer envelope with two image looks selected and two prints per image frame requested, each with a different print look, for his whole roll order of processed images. One of the selected looks for one set of prints is the service basic look, which features high colorfulness that is intermediate in a range of offerings, preferred color rendition based on the North American region, and a lower contrast tone scale; the second look to be applied to the second set of prints is the automated photofinisher selection, based on best image rendition determined by scene categorization algorithm software. The photofinisher receives the film, establishes a customer account, tags the film intended for scanning with a customer identification number, develops the film intended for scanning, scans the film intended for scanning, and then applies each of the two different image appearances requested by the customer to each frame of scanned image data for the entire processed roll of color negative film. The processed images are printed onto silver halide color paper with a CRT printer, the color paper is processed, finished and packaged for shipping with the processed color negatives of the film intended for scanning. The photofinisher ships the order of two sets of different color paper prints to the customer.

Figure 10:
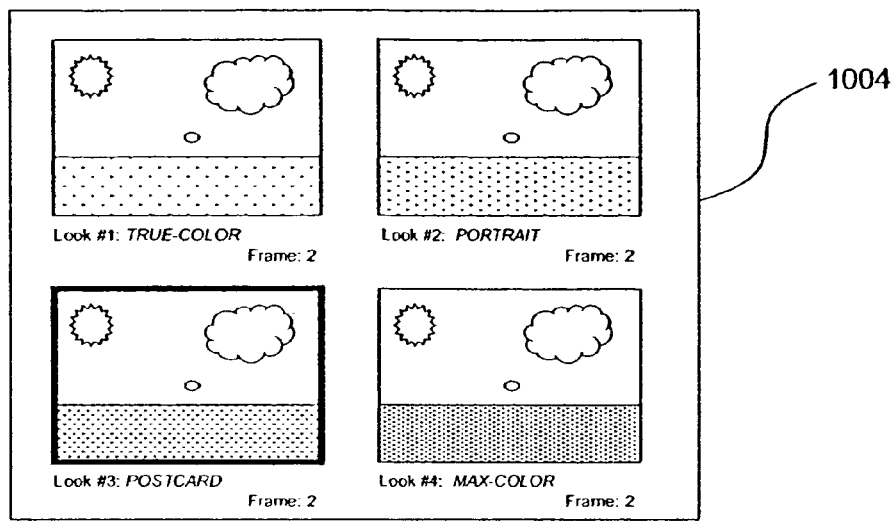
FIG. 10 is a computer monitor display of an Internet Web page showing the selection of image looks provided according to the present invention.

In a second example, a customer visits an Internet World Wide Web site for a photo specialty retailer/photofinisher, and orders a supply of film intended for scanning and their processing mailers, which is shipped to his home via a parcel delivery service after a credit card transaction has been completed. While at the Web site, the customer takes the tour of the variable printing photofinishing service offered by the vendor. In a tutorial screen, the vendor highlights the offering of various printing styles, which can be applied to the customer's image, including true color, high color, portrait color, landscape rendering, basic color rendering with digitally enabled color reproduction preferences, and black-and-white (see, for example, FIG. 10). The customer samples the photofinishing service interactively, by selecting an image from a sample customer roll displayed like an index print on the Web screen, by taking that selected image to a customization screen where he can select four of the available looks to apply to the sample image, and by displaying three side-by side renditions of the sample image with the selected printing styles (see FIG. 10).

The customer then views his output printing options, which includes interactively selecting pictures and styles to print following film development. The customer exposes the roll of film intended for scanning, completes the photofinishing mailer electing to try the interactive picture selection service, and he mails the mailer with the contained film. The mailer is received by a local photofinishing service, and a customer account is created to bill the transaction; a customer identification number is associated with the roll of film, and the film is developed and scanned. The customer is notified by e-mail that his film has been scanned. The customer again visits the Web page of the photofinishing service and provides a password that admits him to another page in a secure section of the network, which contains an index display of all of the images from his roll.

The customer then selects five of the 15 available images for printing, and examines each of the five desired images at the customization Web page, where he determines which printing style is his preference for each image. Those five images are printed by the photofinisher using an inkjet printer according to the customer selection, and the prints are packaged. Image data files are created of the five images selected for printing with the printing style selected by the customer; image data files of all 15 available images rendered in the normal printing style are also created. All 20 image data files are written to a photographic image CD in a commonly accessible image data file format; the image file construction with metadata encoding allows the photofinisher to recreate the basic customer image data file from modest file sizes produced by data compression as needed for further image processing and to apply any of the available looks at the customer's request at a later date. The image prints that were printed according to the selection of the customer and the photographic image CD are packaged together and shipped to the customer. The processed color negatives derived from the film intended for scanning are not returned to the customer by his selection of that option. In addition, at the time of the creation of image data files, downloadable compressed image data files are made available on the server that the customer can access in order to download his image files prior to the arrival of the package of prints and the photographic image CD.

Before receiving his prints and the CD, the customer decides he would like two additional prints of images he elected not to print following initial development and printing. The customer revisits the photofinisher Web page, enters the secure customer image storage area and visits the Web page displaying his index image file set. The customer selects those two images, selects new looks to be applied to the two images, and he creates a new printing order transaction and billing cycle. The customer also downloads an image file from the Web page in order to send an e-mail message with an attachment of the image to another party. The customer arranges the seven images with his selected looks in an electronic photo album Web page that is part of the image network offer by the photofinisher; he then annotates the Web page via PC telephony with comments and captions. The customer transmits the password associated with that secure Web page to a relative via e-mail to invite their viewing of his photography and his artistic creation.

FIGS. 8–11 illustrate further features of the photofinishing method and system of the present invention. In a first arrangement, it is possible for a photofinishing service provider (i.e., a wholesale photofinishing lab, a minilab, a retail store, an online service provider, etc.) to identify customer preferences utilizing an interactive "look preference" identification screen by way of their home computer or a computer at a retail location. More specifically, a photofinishing service provider can track previous customer selections as to picture "look" and return the customer to that "look" at the next interaction. Thereafter, the photofinishing service provider can customize the next selection screen based on past preferences. The photofinishing service provider can also track "look" preferences through total order fulfillment.

Figure 8:
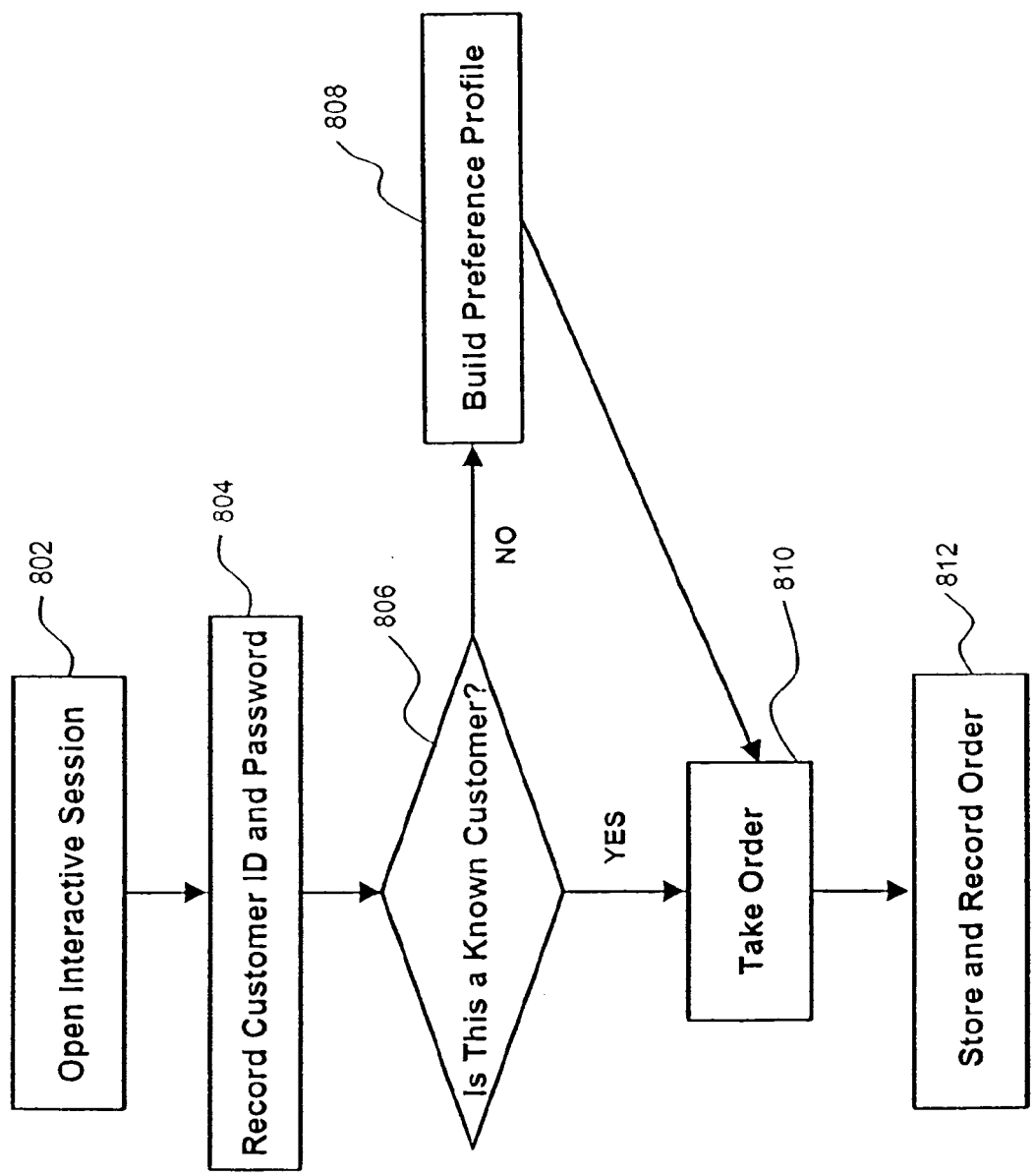
FIG. 8 is a block diagram showing further features of a photofinishing system according to the present invention.

In the system as illustrated in FIG. 8, when a customer opens up an interactive session via, for example, his/her home computer, and connects with the photofinishing service provider via, for example, the World Wide Web, the photofinishing service provider can offer various looks to the customer at the interactive screen and record the customer's selection. During the interactive session, the photofinishing service provider can also return previously chosen looks to the customer at the screen and tie a unique film identification (ID) to the customer's preferred look based on the interactive screen. Thereafter, the photofinishing service provider can provide digital processing derived by, for example, scanning and/or digitization of exposed and photographically developed film according to the preferred look at the interactive screen.

Figure 9:
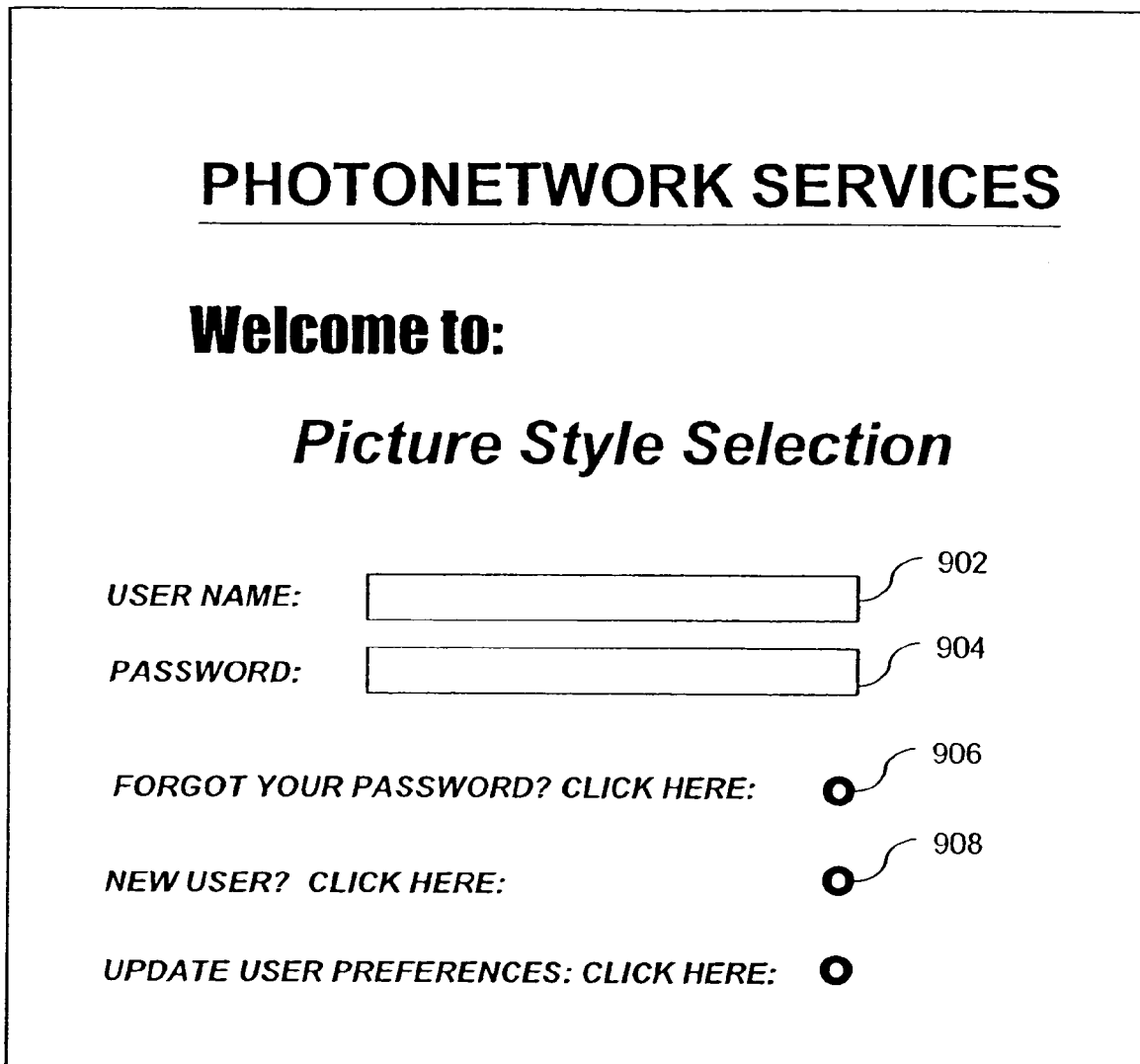
FIG. 9 is a computer monitor display of a customer identification and log-on page.

More specifically, in the system and method of the first arrangement, the customer would first open an interactive ordering session (step 802). After the customer opens the ordering session, and connects with a photofinishing service provider, the photofinishing service provider can capture the customer ID (step 804) via, for example, the logon ID 902/password 904 entered at the customer's web access device as illustrated in FIG. 9. As a further option, the photofinishing service provider can offer an ancillary ID/password reminder function 906 using well-known techniques. New users can be automatically directed 908 towards tutorial screens relating to the screens shown earlier as FIGS. 3 through 4B that will describe the photofinishing service offerings. Known users who directly reach service entry points such as those shown in FIGS. 3–4B can also be provided with the pre-built preference profiles to be described below. The photofinishing service provider thereafter provides the customer ID to a server and checks for the existence of a customer profile on this server in a file that is identified by the customer ID (step 806). If the customer does not have a profile, then the system proceeds with step 808 that commences the building of a preference profile that is unique to the customer.

In building the profile, the photofinishing service provider can pass a generic order screen to the customer's web access device. Thereafter, the photofinishing service provider can capture customer order characteristics, such as for example, items, quantity, payment method, delivery method, etc., and preferred picture look preferences (like that shown earlier as FIGS. 3–4B). Possible picture look preference choices vary according to criteria such as colorfulness or color intensity (black and white to high color); color shading or hue; contrast (low to high); or low to high detail (softer portrait look to every-small-feature-shows look). Further look preferences can include most accurate color style, portrait style (muted color, best skin tones), brilliant color style (highly saturated colors, postcard look), historic sepia style, black and white style, etc.

One embodiment of the first arrangement discussed above is illustrated in FIG. 10. Here the choices are presented as multiple renditions 1004 of a single scene on one screen 1002 with the renditions varying along the named criteria discussed above, and the customer is asked to choose 1006 his/her favorite rendition. After three to five screens, each probing a distinct single scene, the customer's average look/preference choice can be identified and a profile developed accordingly.

In a further embodiment of the first arrangement, a single scene can be shown to the customer on a screen and the customer can be asked to mouse-position a set of on screen sliders (or radio buttons) to bring the scene to his/her favorite look. After three to five screens, each probing a single scene, the customer's average look/preference choice can be identified and a profile established. In a still further embodiment of the first arrangement, a customer can choose to defer his/her look/preference until the return of the exposed film.

After the profile is built, product preparation directions which follow the customer's order characteristics and the customer's average look/preference can be provided along with payment and delivery directions to the server, and these directions can be passed to an order fulfillment service/function station (step 810), following generally the scheme illustrated in FIGS. 2–4. Thereafter, the look/preference choices and the directions can be stored (step 812) in a new file which is identified by the customer ID and a date stamp.

Figure 11:
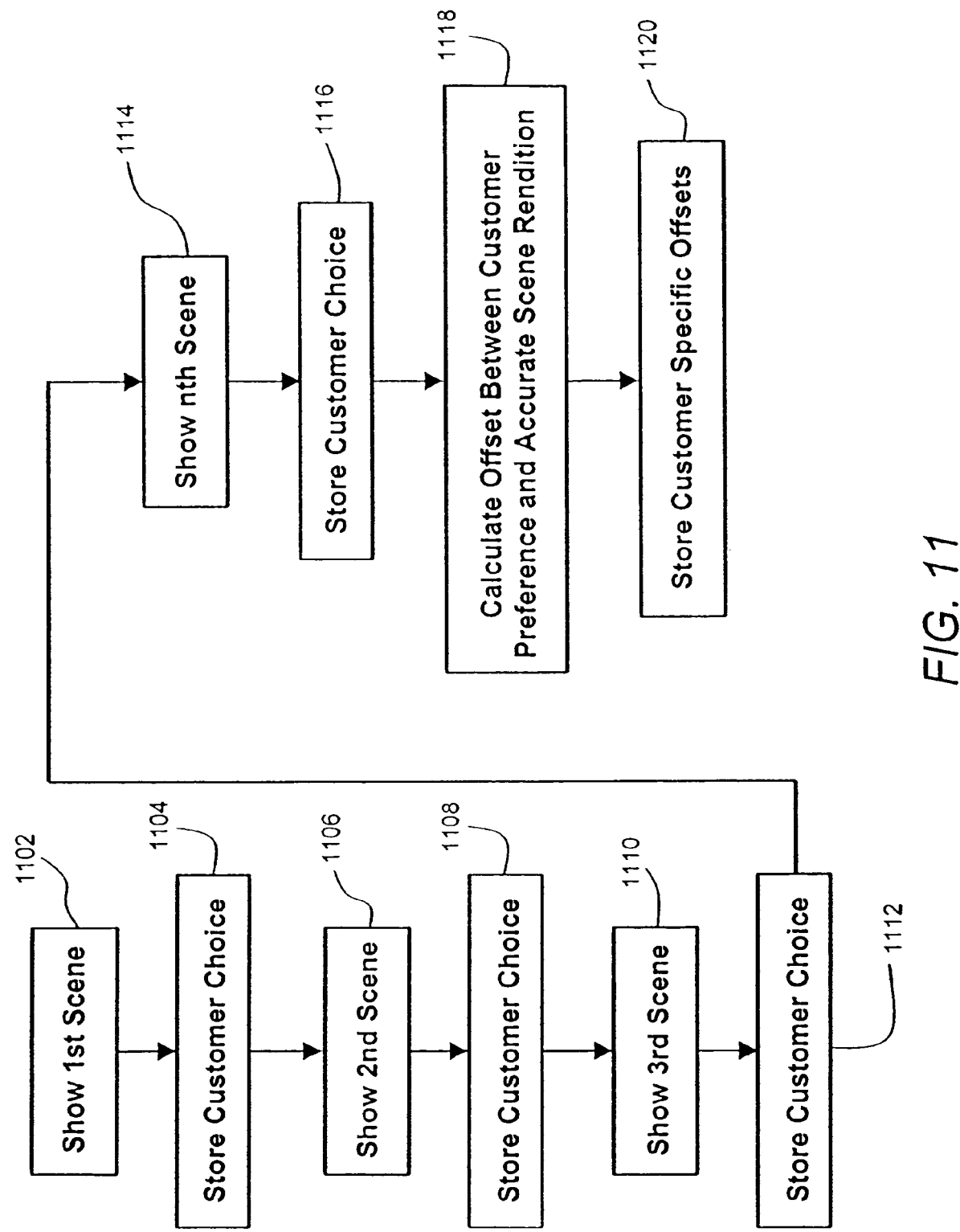
FIG. 11 is a block diagram which illustrates the building of a customer profile for personalized image look selection in accordance with a further feature of the present invention.

The building of a preference profile is schematically illustrated in greater detail in FIG. 11. Here, the selected interrogatory scenes are sequentially passed to the customer, steps 1102, 1106, 1110 and 1114, and the customer's rendition preferences for the individual scenes are recorded, steps 1104, 1108, 1112 and 1116. Based on the tonal and color differences between that preferred rendition of each scene and the spectrally and tonally accurate position of each scene, the average offset to the accurate spectral and tonal values that best fulfill the customer's preferences are determined and recorded at step 1118. The selected interrogatory scenes are chosen to span the range of scenes typically encountered and can include low and high contrast scenes, scenes with a high memory color content, busy scenes, indoor scenes, outdoor scenes and so forth. Clearly, a single scene can be used to probe several of these axes.

In another embodiment, a single scene can be shown on each screen and interactive means, such as radio buttons or sliders, can be provided for actively altering scene characteristics until a preferred rendition is achieved, and the position of the sliders or radio buttons recorded and passed back to the server.

In another embodiment, not shown, the customer may be provided with a brochure showing various renditions of the interrogatory scenes and instructions for first choosing between the scenes and then entering the choices, either directly on the brochure or otherwise communicating the selection to the photofinishing service provider as for example via an interactive web-page or a touch screen at a kiosk. This embodiment can be preferred since it tends to suppress artifacts relate to the specific color and tonal characteristics of a particular soft copy display. This embodiment can also be preferred when communications between the customer's information entry point and the server are challenged.

More generally, when communications between the customer's information entry point and the server are facile, the entry point can act primarily as a data entry and display device, however, when communications are intermittent, slow or otherwise bandwidth restricted, the selection routine can be downloaded to the entry point as a free standing application, as for example a JAVA applet.

Figure 4B:
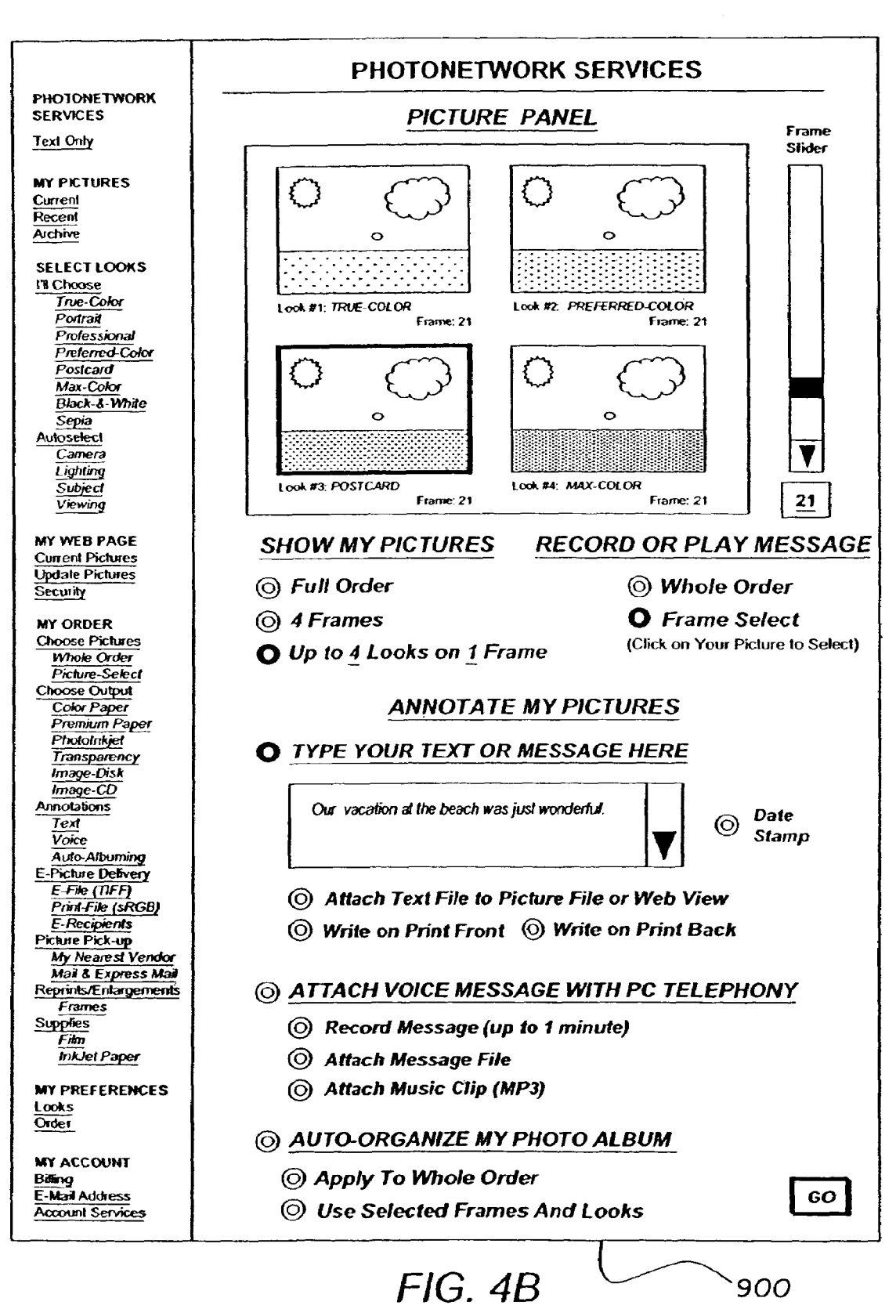

In yet another embodiment, selections around the customer's own scenes, as described in FIGS. 4A and 4B can be employed to form the basis for determining the average offset required to provide preferred renditions to the customer at future sessions.

If at step 806 (FIG. 8) it is discovered that the customer does have a profile in existence, the photofinishing service provider can retrieve the customer's preferences from a server file identified by the customer's identification. The photofinishing service provider can post all customer order characteristics to the customer's web access device, and present one of the previous look/preference probing screens pre-set to the customer's last chosen look. As an option, the photofinishing service provider can present one of the customer's images from a recent order pre-set to the customer's last chosen look. Next, the photofinishing service provider can capture the customer order characteristics (such as items, quantity, payment method, delivery method, etc) and preferred picture look/preferences. As noted above, possible picture look/preference choices vary according to criteria such as color intensity (black and white to high color); contrast (low to high); etc.

In the embodiment which involves building a profile, multiple renditions of a single scene on one screen can be presented to the customer, with the renditions varying along the name criteria and the customer being asked to choose his/her favorite rendition. After three to five screens, each probing a single scene, the customer's average look/preference choice can be identified. In the further embodiment with a respect to a pre-existing profile, a single scene can be shown on a screen and a customer can be asked to mouse/position a set of on-screen sliders (or radio buttons) to bring the scene to his/her favorite look. After three to five screens, each probing a single scene, the customer's average look/preference choice can be identified.

After the customer's look/preference choices have been selected (regardless of whether a profile has been built or a preexisting profile has been used), the photofinishing service provider can pass product preparation directions following the customer order characteristics and the customer's average look/preference along with payment and delivery directions to a server. Further, the photofinishing service provider can pass directions to an order fulfillment station for fulfilling the customer's specific orders. Thereafter, the photofinishing service provider can store the look/preference choices and all directions in a customer's file identified by the customer's identification and a date stamp.

In the first arrangement, noted above (regardless of whether a profile has been built or a preexisting profile has been used), after the interactive session is closed, the photofinishing service provider can proceed to fulfill the film order (order fulfillment function). In doing this, the photofinishing service provider can proceed to make arrangements for the execution of payment, and pull unexposed film according to the order and the recorded unique film ID. The photofinishing service provider can additionally proceed to pull an unused film return envelope and endorse the envelope with the unique film identification, the customer identification, and customer order preferences and desired look/preference. All the endorsements can preferably be made in both human readable and machine readable form. If the customer desires to chose look/preference later, the envelope can be endorsed accordingly, and include a reminder and illustrative samples to encourage a look/preference choice. The photofinishing service provider further associates the unexposed film and the unused film return envelope. Thereafter, the photofinishing service provider can access the server and customer file and store the unique unexposed film identification in that file in association with other specific order characteristics (look/preference), and thereafter execute order delivery.

Once the customer receives the unexposed film, they can expose the film accordingly, and return the exposed film to the photofinishing service provider. The photofinishing service provider receives the exposed film in an endorsed envelope. If the look/preference on the endorsed envelope matches the stored look/preference, then the photofinishing service provider proceeds with order fulfillment in accordance with the customer's request. If no look/preference is indicated in the stored customer file, the customer file is updated with the look/preference chosen and also, an indication that the look/preference was chosen after order placement. If the look/preference on the envelope does not match with the stored look/preference, the customer file is updated with the look/preference indicated on the envelope, and an indication is made that the look/preference was changed after an initial order placement.

Thereafter, the photofinishing service provider can proceed to process the imagewise exposed film, scan the film ID, scan images, etc. After processing, the photofinishing service provider accesses a server and based on the film ID, identifies customer specifications as to look/preference, etc. Based on this, the photofinishing service provider can prepare prints, etc. according to customer specifications including look/preference, and return the prints to the customer. Additionally, the photofinishing service provider can add a descriptive filler to the returned prints to specifically indicate which look/preference was chosen and when it was chosen.

In a second arrangement of a further feature of the present invention, it is possible to create a soft display (monitor) color profile by providing selectable test targets and recording the customer's best match judgment between the provided target and on screen colors. The test targets can be chosen from provided trade-dress, provided calibration patches or preferred memory. Sliders/radio buttons/ring-around can be provided to alter color signals and if an accurate color is not possible, the photofinishing service provider can thereafter inform the customer.

In such a system, as in the first arrangement discussed above, the customer opens an interactive session. The photofinishing service provider can capture the customer ID from a logon ID/password and enter the customer's web access device. Otherwise, the photofinishing service provider can offer an ancillary ID/password reminder function. During the interactive session, the monitor resolution, monitor color depth, monitor color temperature, operating system information, video card information of the customer's web access device and monitor drive information can be captured using standard browser calls.

Thereafter, the monitor and system settings of the customer's web access device are compared to preferred system settings that provide the best calibration results. If the current settings are acceptable, these settings can be recorded and stored at a server. If the current settings are not acceptable, the customer can be provided with suggested monitor and system settings for best results. Further, the photofinishing service provider can request that the customer make suggested changes and restart the session if the customer accepts the suggested changes. If the customer does not accept the suggested changes, the photofinishing service provider can provide the customer with a warning that remote calibration may be sub-optimal.

In the event that the settings are acceptable, as indicated above, the settings along with the customer identification can be stored at a server. At this point, the photofinishing service provider can check for the existence of a customer color profile on the server in the file identified by the customer's ID. If no profile is found, the photofinishing service provider can proceed to build a customer profile. If a profile exists, the photofinishing service provider can utilize the existing profile.

In building a profile, the photofinishing service provider will pass a color calibration tool to the customer's web access device. In one embodiment (color matching) the tool can include a sequence of screens, each of which presents a patch of a particular color with a set of variations (ring-around) of hue-modified renditions, chroma-modified renditions, and/or lightness-modified renditions of that same color. The customer is instructed to pick the best match between the screen display and an in-hand standard. The in-hand standard can be a set of ID calibration patches previously provided to the customer, or it can be a set of ID patches printed in a recent catalogue, or it can be an article having a multi-colored trade-dress, etc.

In a second embodiment (color matching), the tool can be presented as a sequence of screens, each of which presents a color patch with a set of control-sliders or control-radio buttons which can independently control the R, G and B content of the transmitted patch. The customer is thereafter instructed to choose the slider combination or radio-button combination that provides the best match between the presented patch and the in-hand standard.

In a third embodiment (memory preferences), the tool can include a sequence of screens, each of which presents a memory color (sky, grass, skin, etc.) and is labeled with that memory color. The customer is requested to choose which color rendition best accommodates his memory preferences. Either a color matching protocol or a control method can be employed here.

In each of the above embodiments, the color calibration tool can be controlled remotely from the server or it can be a downloaded tool. As a further option, mixed combinations of the first, second and third embodiments can be employed.

Other useful remote color calibration schemes are described by Gu, U.S. Pat. No. 5,874,988; Daly, et al., U.S. Pat. No. 5,754,222; Collette, U.S. Pat. No. 5,081,529; by W. Benedetti in Photo Electronic Imaging, page 28-ff, March 2000; and in the Imation Verifi™ color system. The underlying computer instructions to drive all the look optimization schemes described herein can be provided remotely, as a free-standing applet run during the optimization or as installed software depending on the cost and convenience of communication between the customer's data entry point and the photofinisher's server.

After the above options are presented to the customer, the customer employs the chosen color calibration tool to choose the modifications to each provided color patch that provides the best match between his screen output and the in-hand color patches. The best-matched customer judgments from above are returned to the server and the R, G, B characteristics that compensate for the biases of the user's soft display screen are calculated. The color calibration tool with all color patches modified is passed back to the customer's web access device for confirmation by the customer. Further, notice is given that the colors of the color calibration tool have been modified to account for the customer's judgment. If the customer confirms, then the photofinishing service provider can proceed to use the profile, or else use the information to build a profile for an additional pass, and keep count of the number of passes. After two passes, if the colors are still not correct in the customer's judgment, the photofinishing service provider can suggest that color calibration is not likely to succeed and record the results. Thereafter, all the colors can be reset to a standard valve and the program can be closed.

In the event that the customer already has a profile stored, the photofinishing service provider can retrieve the customer color preferences from the server file identified by the customer identification. The photofinishing service provider checks the retrieve monitor and system settings and compares them to the monitor and systems settings captured in the current session. If different, the system can proceed to indicate that the color profile should be rebuilt for best results and directs the customer to build a profile. If everything is acceptable, the photofinishing service provider program can transmit several test colors to the customer's access device using the deviations built into the customer's profile and ask the customer to confirm transmitted colors. If rejected, either that color profile should be rebuilt for best results and the customer should be directed to build a profile. Otherwise, the color deviations can't be employed and embedded in the customer profile to conduct a transaction. At the end of the transaction, the color deviations recorded are employed along with the transaction data.

It is noted that the methods and systems described can be part of a computer program product that includes a computer readable storage medium with a computer program stored thereon. When the computer program product is loaded with a computer, it causes the computer to process images and perform photofinishing services in the manner described in the present specification.

The invention has been described in detail with particular reference to certain preferred embodiments thereof, but it will be understood that variations and modifications can be effected within the spirit and scope of the invention.

What is claimed is:

1. A photofinishing method comprising the steps of:
   a) offering a plurality of predetermined available image looks to a customer in a manner which permits the customer to select at least one image look for association with at least one image captured by the customer on scan-only photographic material;
   b) converting the at least one image to an image-bearing electronic signal representative of the at least one image;
   c) applying the selected look to the image-bearing electronic signal representative of the at least one image;
   d) processing the image-bearing electronic signal to provide a processed image that incorporates properties of the selected image look; and
   e) transferring the processed image to at least one of a customer or an intended recipient,
   wherein the step of offering a plurality of image looks comprises displaying the image looks to a customer in a color brochure, to permit the customer to select a desired image look from the displayed image looks prior to viewing the processed image.

2. A method according to claim 1, further comprising the step of printing the processed image.

3. A method according to claim 1, wherein said step of offering the image looks to a customer comprises representing the image looks on a display medium.

4. A method according to claim 3, wherein the step of representing the image looks on a display medium comprises displaying the image looks to a customer on a color monitor, to permit the customer to select a desired image look from the displayed image looks subsequent to viewing the processed images.

5. A method according to claim 1, wherein the scan-only photographic recording material is a color negative film.

6. A method according to claim 1, wherein the image looks include one or more looks from a list that includes accurate color reproduction, portrait color, high color, black-and-white, old-fashioned sepia tones, selected levels of color intensity, selected levels of contrast, selected levels of detail, selected levels of sharpness, and selected levels of grain.

7. A method according to claim 1, wherein the converting of the at least one image to an image-bearing electronic signal representative of the at least one image occurs at a different location than the processing of the image-bearing electronic signal to provide a processed image having the properties of the selected image look.

8. A photofinishing method comprising the steps of:
a) offering a plurality of predetermined available image looks to a customer in a manner which permits the customer to select at least one image look for association with at least one image captured by the customer on scan-only photographic material;
b) converting the at least one image to an image-bearing electronic signal representative of the at least one image;
c) applying the selected look to the image-bearing electronic signal representative of the at least one image;
d) processing the image-bearing electronic signal to provide a processed image that incorporates properties of the selected image look; and
e) transferring the processed image to at least one of a customer or an intended recipient,
wherein the customer is a photographer and the step of offering the plurality of image looks comprises displaying the image looks to the photographer in a color brochure to permit the photographer to select a desired look subsequent to viewing the processed images.

9. A method according to claim 8, further comprising the step of printing the processed image.

10. A method according to claim 8, wherein said step of offering the image looks to a customer comprises representing the image looks on a display medium.

11. A method according to claim 10, wherein the step of representing the image looks on a display medium comprises displaying the image looks to a customer on a color monitor, to permit the customer to select a desired image look from the displayed image looks subsequent to viewing the processed images.

12. A method according to claim 8, wherein the scan-only photographic recording material is a color negative film.

13. A method according to claim 8, wherein the image looks include one or more looks from a list that includes accurate color reproduction, portrait color, high color, black-and-white, old-fashioned sepia tones, selected levels of color intensity, selected levels of contrast, selected levels of detail, selected levels of sharpness, and selected levels of grain.

14. A method according to claim 8, wherein the converting of the at least one image to an image-bearing electronic signal representative of the at least one image occurs at a different location than the processing of the image-bearing electronic signal to provide a processed image having the properties of the selected image look.

15. A photofinishing method based on an interactive photofinishing service ordering session between a photofinishing service provider and a customer, the method comprising:
a) checking for a stored customer profile for the customer based on at least a customer identification of the customer, said customer profile including information representative of previously selected preferred image looks for the customer;
wherein:
b) if the customer has a stored customer profile, the method comprises:
(i) offering a plurality of possible image looks to the customer in a manner which permits the customer to select a preferred image look which is to be applied to an image bearing electronic signal representative of a captured image, at least one of said offered possible image looks being a previously selected preferred image look from said stored customer profile; and
(ii) updating the stored customer profile based on the selected preferred image look; and
c) if the customer does not have a stored customer profile, the method comprises:
(i) offering a plurality of possible image looks to the customer in a manner which permits the customer to select at least one image look which is to be applied to an image bearing electronic signal representative of a captured image; and
(ii) creating a new customer profile based on the selected image look.

16. A computer program product, comprising a computer readable storage medium having a computer program stored thereon, which when loaded into the computer, causes the computer to perform the steps of:
(I) offering photofinishing services based on an interactive photofinishing service ordering session between a photofinishing service provider and a customer which comprises:
a) checking a server for a stored customer profile for the customer based on at least a customer identification of the customer, the customer profile including information representative of previously selected preferred image looks for the customer;
wherein:
b) if the customer has a stored customer profile, the method comprises:
(i) offering a plurality of possible image looks to the customer in a manner which permits the customer to select a preferred image look which is to be applied to an image bearing electronic signal representative of a captured image, at least one of said offered possible image looks being a previously selected preferred image look from said stored customer profile; and
(ii) updating the stored customer profile based on the selected preferred image look; and
(c) if the customer does not have a stored customer profile, the method comprises:
(iii) offering a plurality of possible image looks to the customer in a manner which permits the customer to select at least one image look which is to be applied to an image bearing electronic signal representative of a captured image; and (iv) creating a new customer profile based on the selected image look.

17. A photofinishing method based on an interactive photofinishing service ordering session between a photofinishing service provider and a customer, wherein the customer accesses a monitor during the ordering session, the method comprising:
   a) determining monitor settings of the monitor accessed by the customer;
   b) comparing the determined monitor settings to optimum monitor settings that provide preferred calibration results;
   c) providing color calibration information to the customer based on said comparing step; and
   d) checking for a stored customer profile for the customer based on at least a customer identification of the customer, said customer profile including information representative of preferred monitor settings for the customer.

18. A method according to claim 17, wherein:
   (e) if the customer has a stored profile, the method comprises:
   (i) retrieving the preferred monitor settings in the stored customer profile;
   (ii) offering the preferred monitor settings to the customer for association with the customer's images; and
   (iii) updating the stored profile; and
   (f) if the customer does not have a stored profile, the method comprises:
   (i) offering monitor settings to the customer for association with the customer's image; and
   (ii) building a customer profile based on the customer's preferred monitor settings.

19. A computer program product, comprising a computer readable storage medium having a computer program stored thereon, which when loaded into the computer, causes the computer to perform the steps of:
   offer photofinishing services based on an interactive photofinishing service ordering session between a photofinishing service provider and a customer, wherein the customer accesses a monitor during the interactive ordering session;
   determine monitor settings of the monitor accessed by the customer;
   compare the determined monitor settings to optimum monitor settings that provide preferred calibration results;
   provide color calibration information to the customer based on said comparing step; and
   check for a stored customer profile for the customer based on at least a customer identification of the customer, said customer profile including information representative of preferred monitor settings for the customer.

20. A computer program product according to claim 19, wherein:
   if the customer has a stored profile, the computer performs the steps of:
   retrieving the preferred monitor settings in the stored customer profile;
   offering the preferred monitor settings to the customer for association with the customer's images; and
   updating the stored profile; and
   if the customer does not have a stored profile, the computer performs the steps of:
   offering monitor settings to the customer for association with the customer's image; and
   building a customer profile based on the customer's preferred monitor settings.

* * * * *